(12) United States Patent
Rose et al.

(10) Patent No.: US 10,605,697 B2
(45) Date of Patent: Mar. 31, 2020

(54) TYRE CONDITION ANALYSIS

(71) Applicant: WHEELRIGHT LIMITED, Oxfordshire (GB)

(72) Inventors: Peter Norman Rose, Oxfordshire (GB); Alexander Paul Codd, Oxfordshire (GB); Syed Wajahat Ali Shah Kazmi, Oxfordshire (GB)

(73) Assignee: WHEELRIGHT LIMITED, Oxfordshire (GB)

( * ) Notice: Subject to any disclaimer, the term of this patent is extended or adjusted under 35 U.S.C. 154(b) by 162 days.

(21) Appl. No.: 15/766,739

(22) PCT Filed: Oct. 10, 2016

(86) PCT No.: PCT/GB2016/053148
§ 371 (c)(1),
(2) Date: Apr. 6, 2018

(87) PCT Pub. No.: WO2017/060739
PCT Pub. Date: Apr. 13, 2017

(65) Prior Publication Data
US 2018/0299352 A1    Oct. 18, 2018

(30) Foreign Application Priority Data

Oct. 9, 2015  (GB) .................................. 1517926.0

(51) Int. Cl.
*G01M 17/02* (2006.01)
*B60C 11/24* (2006.01)
(Continued)

(52) U.S. Cl.
CPC ......... *G01M 17/027* (2013.01); *B60C 11/246* (2013.01); *G01B 11/22* (2013.01);
(Continued)

(58) Field of Classification Search
CPC .... G01M 17/02; G01B 11/22; G01B 11/2433; G01B 11/2408; G01B 2210/22
See application file for complete search history.

(56) References Cited

U.S. PATENT DOCUMENTS 5,987,978 A * 11/1999 Whitehead ............. G01B 11/22
                                                          73/146
6,796,043 B2    9/2004 Jackson et al.
(Continued)

FOREIGN PATENT DOCUMENTS

CN         1439090 A      8/2003
CN       102388290 A      3/2012
(Continued)

OTHER PUBLICATIONS

Extended European Search Report dated Feb. 18, 2019, issued in related European Patent Application No. 19151458.7 (7 pages).
(Continued)

*Primary Examiner* — Yosef Kassa

(57) ABSTRACT

The condition of a tyre (5) on a wheel (2) is assessed while the wheel (2) is mounted on a vehicle (1) and while the vehicle (1) is moving. As the vehicle (1) moves, the tyre (5) rotates and moves longitudinally along a path of movement. An imaging device (3, 4) captures images of a plurality of different portions (7) of the periphery of the tyre (5), which has tread portions (10) separated by tread gaps (11), whilst the tyre (5) revolves. While the images are being captured, longitudinally spaced flash units (F1, F2, F3, F4) are activated to illuminate portions (7) of the periphery of the tyre (5). The flash units (F1, F2, F3, F4) are positioned to one side of the path of movement of the tyre (5) and direct light at an acute angle to the path of movement of the tyre (5) so that the light causes shadows to be cast in the tread gaps (11) between tread portions (10). Each flash unit (F1, F2, F3, F4) causes a series of flashes of light to be produced when the
(Continued)

flash unit (F1, F2, F3, F4) is activated, each flash of light in the series being separated from the next flash of light in the series by an interval. For any flash units (F1, F2, F3, F4) which are activated at the same time and illuminate overlapping portions of the periphery of tyre (5), the respective series of flashes of light are out of phase so that the flashes of light from one flash unit (F1, F2, F3, F4) are emitted in the intervals between the flashes of light from the or each other flash unit (F1, F2, F3, F4). The images are analysed by data processing apparatus (8) to determine the extent of shadows in the tread gaps (11) so as to provide an indication of the depth of the tread gaps (11).

16 Claims, 18 Drawing Sheets

(51) Int. Cl.
| | | |
|---|---|---|
| *G01B 11/24* | (2006.01) | |
| *G01B 11/22* | (2006.01) | |
| *G06T 7/507* | (2017.01) | |
| *G06T 7/00* | (2017.01) | |
| *H04N 7/18* | (2006.01) | |

(52) U.S. Cl.
CPC ........ *G01B 11/2433* (2013.01); *G06T 7/0002* (2013.01); *G06T 7/507* (2017.01); *G06T 2207/10152* (2013.01); *G06T 2207/30252* (2013.01); *H04N 7/188* (2013.01)

(56) References Cited

U.S. PATENT DOCUMENTS

| | | | |
|---|---|---|---|
| 7,107,138 B2* | 9/2006 | Currie | B60W 30/14 |
| | | | 303/132 |
| 7,260,983 B2 | 8/2007 | Nosekabel et al. | |
| 7,523,655 B2* | 4/2009 | Braghiroli | G01B 11/2755 |
| | | | 73/146 |
| 8,141,414 B2* | 3/2012 | Braghiroli | G01B 11/22 |
| | | | 340/442 |
| 8,284,251 B2* | 10/2012 | Suita | G01M 17/02 |
| | | | 280/79.4 |
| 8,542,881 B2* | 9/2013 | Teti | G06T 7/0004 |
| | | | 382/104 |
| 8,621,919 B2* | 1/2014 | Pingel | B60C 11/246 |
| | | | 73/146 |
| 2009/0320581 A1 | 12/2009 | Angell et al. | |
| 2012/0020526 A1 | 1/2012 | Teti et al. | |
| 2016/0127625 A1 | 5/2016 | Hanel et al. | |

FOREIGN PATENT DOCUMENTS

| | | |
|---|---|---|
| DE | 102013207374 A1 | 10/2014 |
| EP | 1647817 A2 | 4/2006 |
| WO | 2014117870 A1 | 8/2014 |
| WO | 2015/059457 A1 | 4/2015 |

OTHER PUBLICATIONS

Chinese Office Action for Application No. 201680072212.8, dated Sep. 17, 2019, 12 pages.
International Search Report and Written Opinion for Application No. PCT/GB2016/053148, dated Mar. 3, 2017, 14 pages.

* cited by examiner

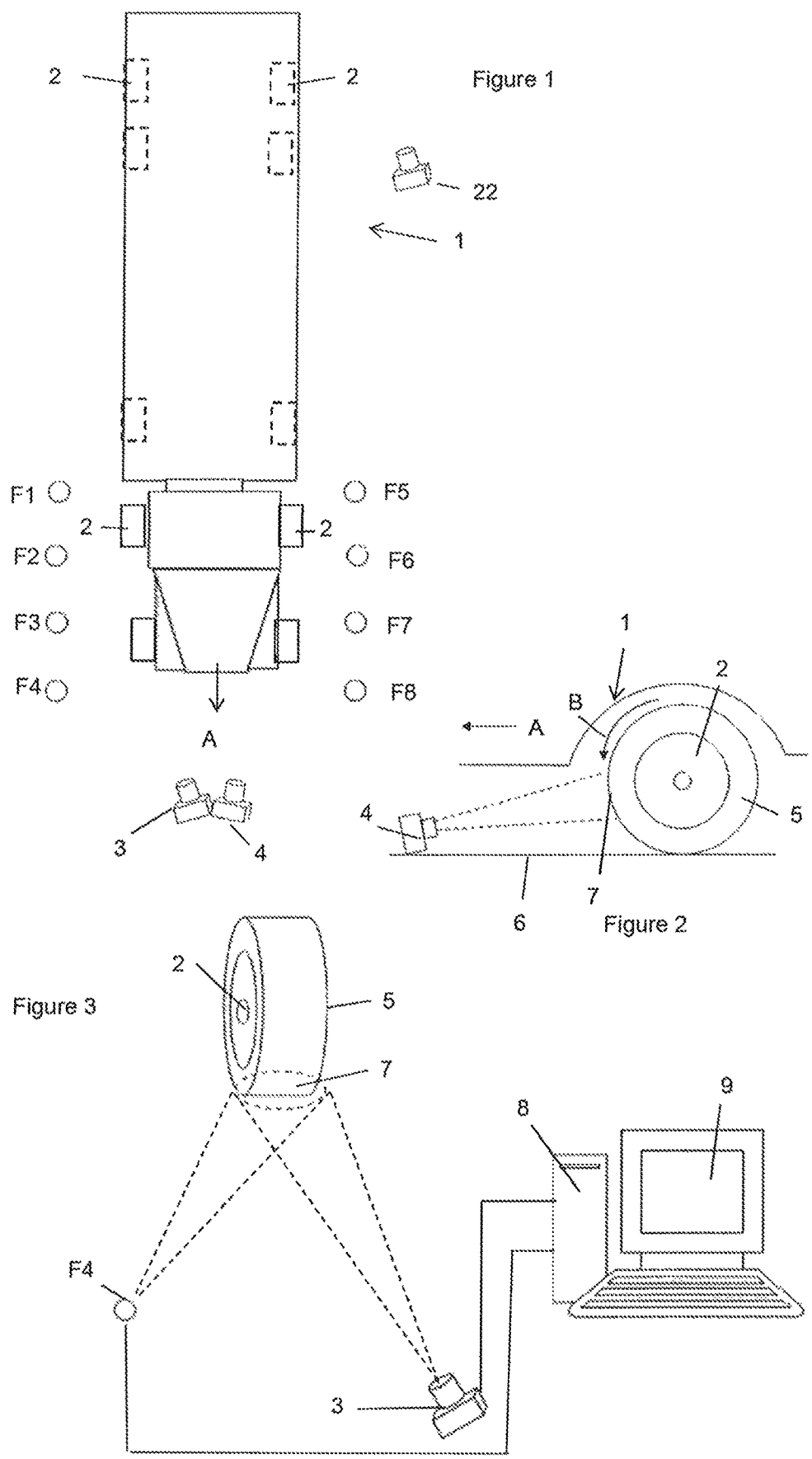

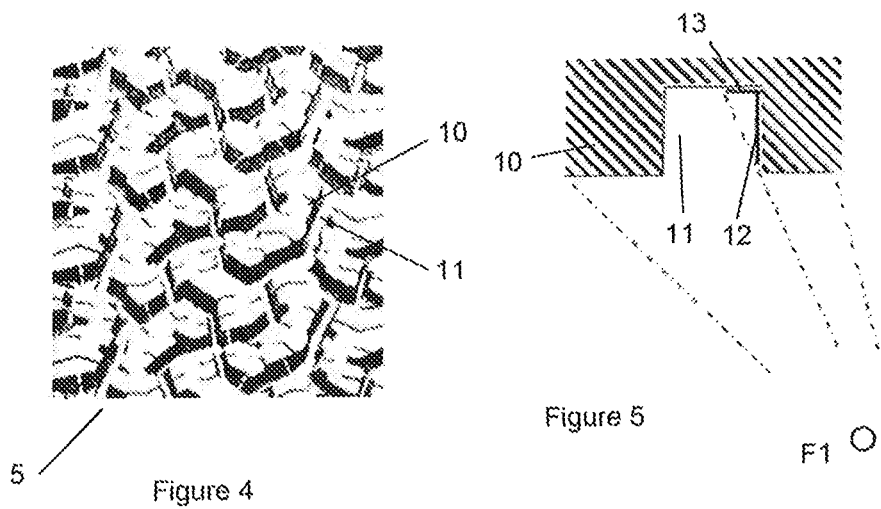
Figure 4
Figure 5
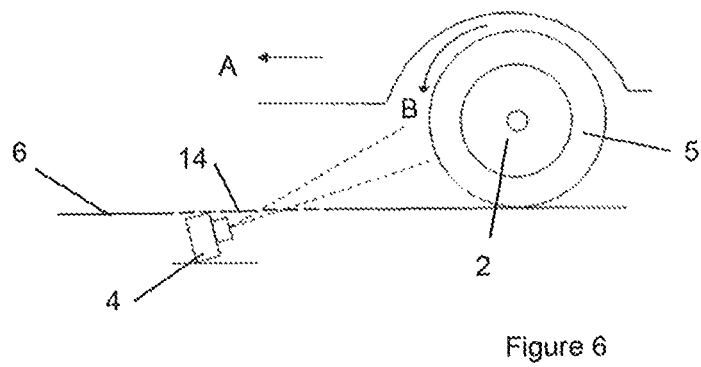
Figure 6
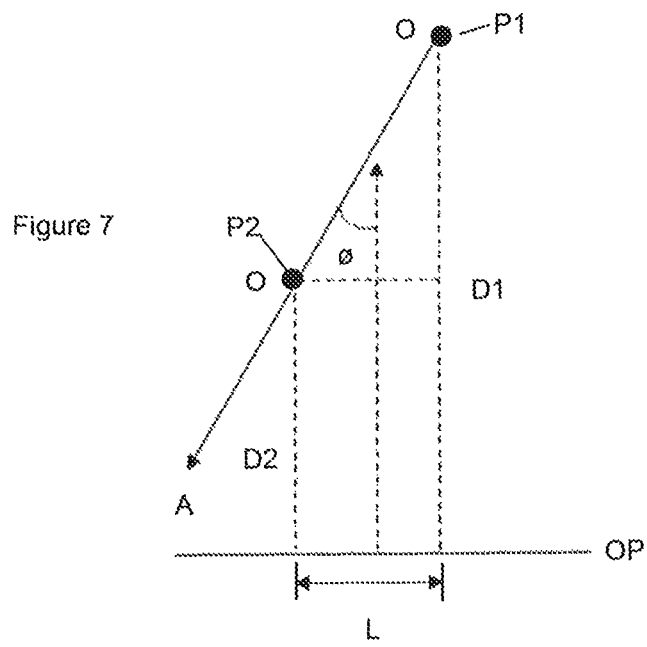
Figure 7

Figure 9
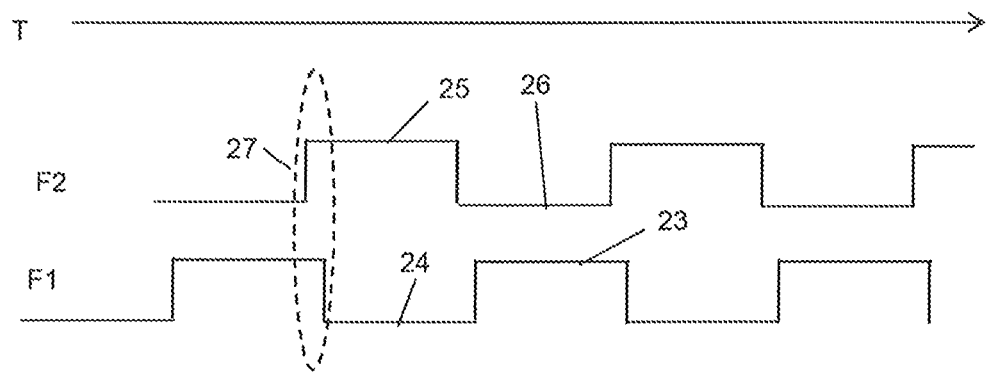
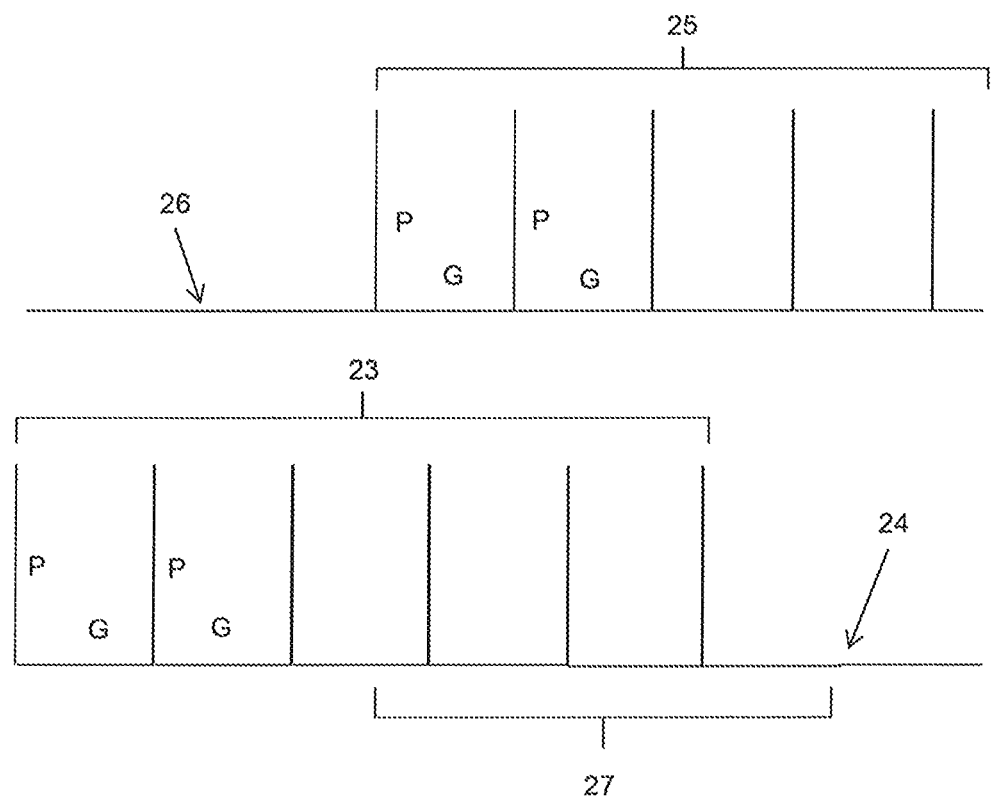
Figure 10

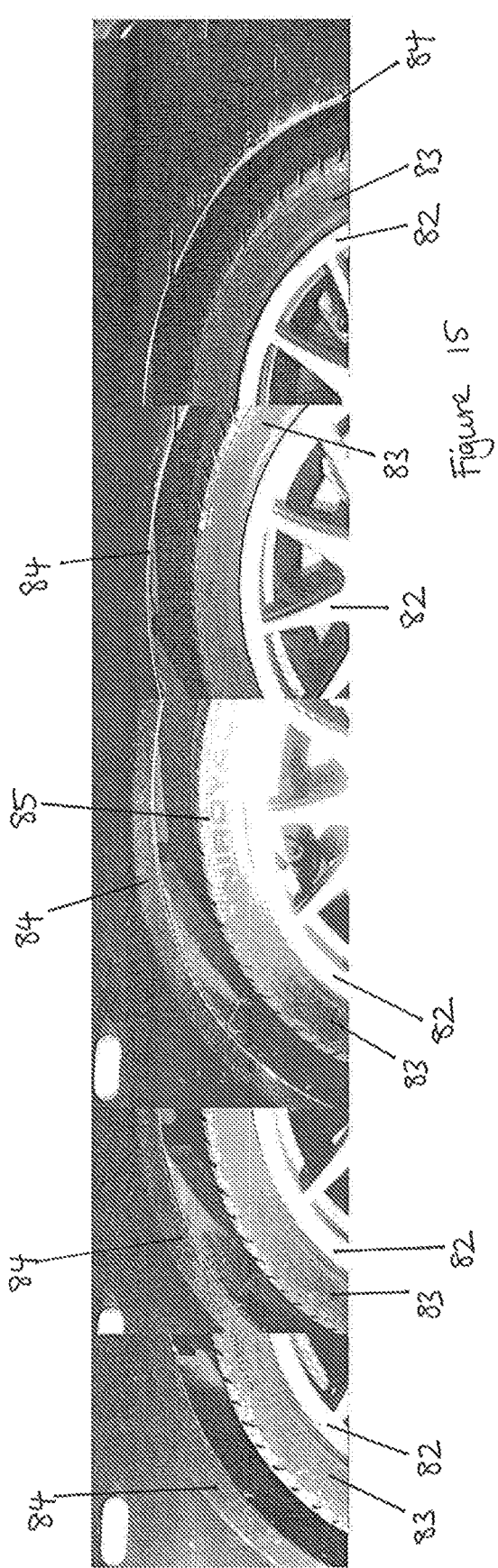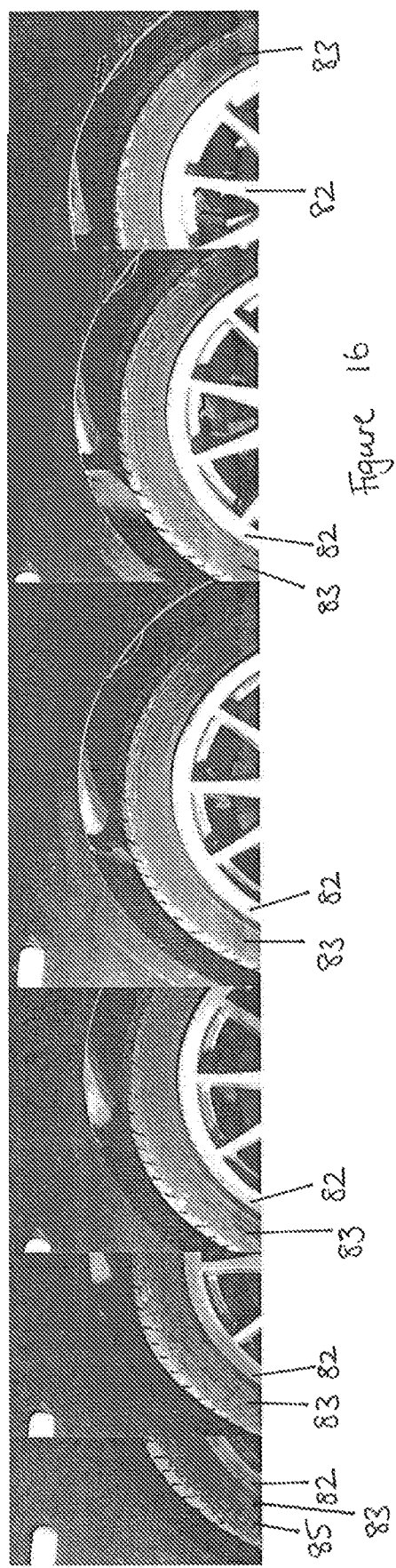

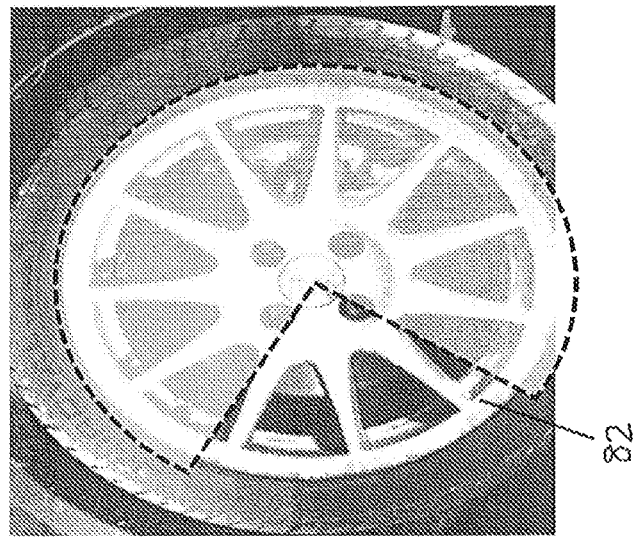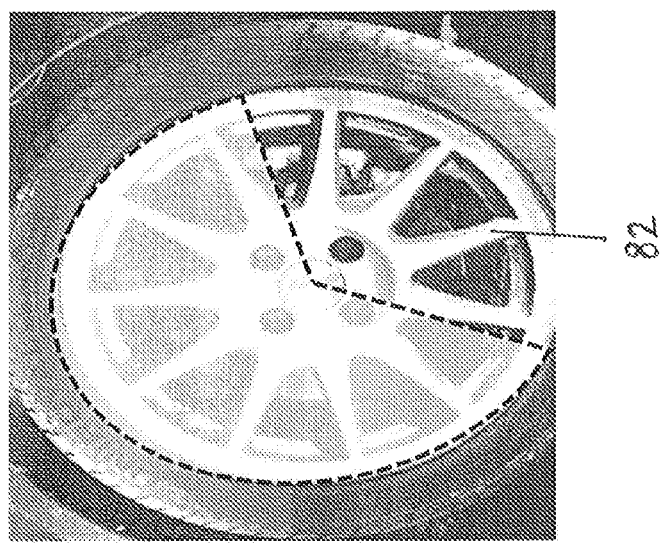
Figure 17

TYRE CONDITION ANALYSIS

CROSS-REFERENCE TO RELATED APPLICATIONS

This application is a National Phase Application of International Application No. PCT/GB2016/053148, filed on Oct. 10, 2016, which claims the priority to and benefit of United Kingdom Patent Application No. 1517926.0, filed on Oct. 9, 2015. Both of the above-referenced applications are incorporated into the present application by reference herein in their entirety.

This invention relates to a method and apparatus for assessing the condition of a vehicle tyre on a wheel, whilst the wheel is rotating and the vehicle is moving. In particular, the invention is concerned with measuring the depth of tread on the tyre.

A system is disclosed in U.S. Pat. No. 5,987,978 for measuring the tread depth of a tyre. In one embodiment, a light source is used to illuminate a tyre obliquely, in such a way that shadows are formed within the recessed portions of the tread pattern. A second light source is provided for illuminating the tyre from a different direction. The first and second light sources may be arranged to operate in an alternating sequence and may be arranged such that the light they produce comes from opposing directions. Those portions of the tyre which are illuminated will reflect a greater intensity of light than those portions at the bottom of the treads which are in a shadowed region. By comparing the reflected light patterns when the tyre is illuminated from each side it is possible to work out the depth of the tread. It is stated that as the tyre wears, the depth of the tread grooves decreases and eventually they will wear down to such an extent that light can be reflected from the bottom of the grooves. It is stated that once this occurs, the width of the shadow is directly related to the depth of the tread. The reflected light is directed towards a camera, where the image is captured and sent to a data processor for processing. The apparatus of U.S. Pat. No. 5,987,978 does not measure the tread depth of a tyre at multiple positions around its circumference, whilst the tyre is rotating and moving along a surface. Instead, the tyre may be rotated on a test bed such as a rolling road, or a sensor may be moved around the periphery of a tyre, for example during a roadside inspection.

In U.S. Pat. No. 8,542,881 there is disclosed a computer vision aided automated tyre inspection system for in-motion inspection of vehicle tyres. A camera at an image acquisition station captures digital images of tyres of an approaching vehicle, and in particular the treads and sidewalls as the vehicle passes through an inspection station. There is a light at the image acquisition station, and this may also be physically separate from the image acquisition station. Sufficient images are captured to cover an entire revolution of a tyre. It is stated that the images are analysed to determine tyre tread depth. There is no disclosure of how the tread depth is measured, using the images.

In WO2015/059457 there is disclosed a system for measuring the depth of tread of a tyre on a wheel of a vehicle whilst the wheel is rotating and moving along the ground. A camera captures images whilst the tyre rotates for at least the major part of its circumference. Light sources are spaced longitudinally and are directed at an acute angle to the path of the tyre, to illuminate the tyre whilst images are captured. The images are analysed by data processing apparatus and the tread depth is determined from the length of shadows in the gaps between tread blocks. The light sources are activated and de-activated sequentially in accordance with signals from longitudinally spaced sensors which detect the presence of the tyre, so that when an image is captured of a portion of the tyre tread, only one light source is activated to illuminate that portion of the tyre tread. In an alternative arrangement, the speed of the vehicle is determined, and the sequence of activation and de-activation of the flash units sequentially is time-based.

In WO2015/059457 it is explained that in some cases it may be necessary to have adjacent light sources activated together so that there are overlapping zones of illumination. This could occur if, for example, there is a vehicle such as a heavy goods vehicle tractor unit which has axle spacing about the same as the distance between the sensors that activate/de-activate the light sources, so that a leading wheel and a trailing wheel operate the sensors at about the same time. This could result in adjacent light sources being activated at the same time, but the light sources are operated in a controlled manner so that the tyre is not in the region of overlapping illumination when images are captured. For example, a first light source would be de-activated before the tyre enters the region of overlap.

The present invention concerns the use of flash illumination for light sources in an arrangement such as that disclosed in WO2015/059457, and one aspect of the invention is particularly, but not exclusively, concerned with providing a method and system that can accommodate vehicles which have closely spaced axles.

Viewed from one aspect, the present invention provides a method of assessing the condition of a tyre on a wheel which is mounted on a vehicle, while the vehicle is moving and the tyre is rotating and moving longitudinally along a path of movement, the periphery of the tyre having tread portions separated by tread gaps; in which the method comprises using an imaging device to capture images of a plurality of different portions of the periphery of the tyre whilst the tyre revolves, the images being captured whilst longitudinally spaced flash units are activated to illuminate portions of the periphery of the tyre, the flash units being positioned to one side of the path of movement of the tyre and directing light at an acute angle to the path of movement of the tyre, the light causing shadows to be cast in the tread gaps between tread portions; and the images are analysed by data processing apparatus which determines the extent of shadows in the tread gaps so as to provide an indication of the depth of the tread gaps; wherein each flash unit causes a series of flashes of light to be produced when the flash unit is activated, each flash of light in the series being separated from the next flash of light in the series by an interval;

characterised in that for any flash units which are activated at the same time and illuminate overlapping portions of the periphery of tyre, the respective series of flashes of light are out of phase so that the flashes of light from one flash unit are emitted in the intervals between the flashes of light from the or each other flash unit.

Thus, a control system can be configured to activate the flash units whilst the tyre moves along said path of movement, so that a flash of light from only one of the flash units illuminates a particular portion of the periphery of the tyre at any time when images are being captured by the imaging device. In the case of there being two flash units which will be activated at the same time and cover overlapping portions of the tyre, if the flash units each produce a flash at the same rate, the imaging device must capture an image at double that rate because in the same period there will be two flashes—one from one flash unit and one from the other.

Thus, in some embodiments of the invention, each flash unit, when activated, produces a series of identical or substantially identical pulses separated by identical or substantially identical intervals; and preferably wherein the imaging device captures images at a rate which is double or substantially double the rate at which pulses are produced when a flash unit is activated It will thus be appreciated that there is no longer the same problem with vehicles having closely spaced axles, since although two adjacent flash units may be activated at the same time, at no point during the period of activation are flashes produced concurrently. During the period of activation, flashes of light from one flash unit will alternate with flashes of light from the other flash unit. By contrast to what is stated WO2015/059457, namely that a first flash unit would be de-activated before a tyre enters a region of overlap, in accordance with the present invention there is no need to deactivate a flash unit—both flash units can continue to be activated and to issue flashes of light, but the flashes are out of phase.

In a method or system in accordance with the invention, images are obtained of a plurality of different portions of the periphery, e.g. the outer surface, of the tyre whilst the wheel and tyre are moving along the path of movement, which can be in a direction either towards or away from the imaging device and the flash units. In some embodiments, images are captured whilst the tyre completes at least a major part of a complete revolution, i.e. at least about one half. During the imaging process, there will be a considerable change in distance between the imaging device and the surface of the tyre being imaged. For example if a tyre has a diameter of about a metre, half of the circumference would be over 1.5 m. The imaging device will be arranged to capture images, in focus, of the rotating tyre whilst the tyre moves towards or away from the imaging device by this distance. For larger tyres and/or to capture images over a greater proportion of the periphery of the tyre, the imaging device will capture images whilst the tyre moves towards or away from the imaging device a greater distance.

The use of a plurality of flash units which are spaced longitudinally and activated whilst the wheel moves along said path of movement so that, when an image is captured, only one flash unit is producing a flash and illuminating the tyre, means that there is always sufficient illumination of the tyre so that a good image can be obtained. The use of a flash of light from only a single flash unit when an image is being captured means that well defined shadows can be obtained and analysed to determine tread depth. Each flash unit provides a zone of illumination and the path of movement of the wheel extends through the plurality of illumination zones, moving from one to the next. In some embodiments, the illumination zones overlap. In some circumstances, when the wheel is wholly within a first zone, a first flash unit is activated and the second flash unit is not activated. When the wheel has entered the area of overlap with the second zone, the second flash unit is activated but in accordance with the invention the first flash unit need not be de-activated and can remain activated. When it is said that a wheel has entered the area of overlap, this includes taking action as the wheel enters the zone, immediately after the wheel entering the zone, or at any other suitable time when the wheel is in the zone of overlap.

It will be appreciated that if the zones of illumination do not overlap, there will be a region of the periphery of the tyre which is not brightly illuminated during its path through the system, so there will be a gap in images of high quality if the intention is to capture images around the entire periphery of the tyre.

A zone of illumination will generally be (in two dimensions) in the form of a segment which is centred around the principal direction in which the output of the flash unit is directed. In three dimensions the zone of illumination could be conical, but it may be preferable to shape the output of the flash unit so that the cross section is not circular but is, for example, elliptical.

When it is said that the flash units are spaced longitudinally, this does not imply that all of the flash units lie on a line which is parallel to the path of movement of the tyre, although in some embodiments the flash units will lie on such a line or on one which is generally parallel to the path of movement of the tyre. However, the flash units could lie on a line which is somewhat inclined with respect to the parallel direction, or the flash units may not lie on a line at all. The flash units in the series may be evenly spaced or generally evenly spaced, or there may be variation in the spacing.

The flash units are chosen to be bright enough to be the dominant source of light illuminating the tread, having regard to background ambient light. In general, there will also be ambient lighting such as daylight or background illumination at night. However the flashes of light from the flash units are preferably so bright that the effect of ambient light is negligible.

In some embodiments, the flash unit will use at least one flash tube, for example a xenon flash tube, to create a burst of bright light. In some embodiments, each flash unit could contain a plurality of flash tubes. In a flash unit with more than one flash tube, the flash tubes will be fired simultaneously. The flash units act as sources of non-collimated light and even though a single flash unit may contain multiple flash tubes, each flash unit effectively acts as a point source of light for the purposes of embodiments of the invention.

In some embodiments a single physical housing could contain two or more flash units, directed at different angles to the path of movement of the vehicle.

A flash unit used in embodiments of the invention, when activated, is preferably capable of generating a burst of light pulses every 40 ms, in other words the flash unit may issue flashes fired at 40 ms intervals (i.e. a flash rate of up to about 25 flashes per second), which may be appropriate for a vehicle travelling at approximately 4.5 metres per second (about 10 miles per hour). However the number of flashes per second can be chosen depending on the requirements and/or the available performance of the flash units. For example, the flash rate could be between about 15 and about 100 flashes per second; or between about 20 and about 50 flashes per second; or between about 25 and about 40 flashes per second.

The width of each flash pulse could be, for example, between about 100 μs and about 200 μs; or between about 120 μs and about 160 μs; or between about 135 μs and about 150 μs. In some embodiments the width could be selectable, for example selecting between about 135 μs and about 150 μs. The flash unit may fire after a pre-set delay from the rising edge of a trigger strobe (which can be the same strobe used to trigger the camera shutter). The length of the delay can be, for example, between about 25 μs and about 200 μs. The length of the delay could be selectable, for example selecting between about 25 μs, about 75 μs, about 125 μs and about 175 μs. The delay is to ensure that the shutter is completely open before the flash unit fires. In some embodiments the shutter is a global shutter so that light collection starts and terminates at the same time for all pixels.

In some embodiments, a trigger signal is sent to the imaging device, which then sends a trigger signal to the flash unit.

Each flash unit may be arranged at a suitable angle to illuminate both tyres on a vehicle axle at the same time.

The imaging device should have a sufficient depth of field and frame rate so that the surface of the periphery of the tyre can be imaged multiple times as the tyre is rolling forwards. As there are alternating flashes from two adjacent flash units in the series, the frame rate of the imaging device needs to be double that of the flash units. For example, if two flash units are issuing flashes at a rate of 12 flashes per second when activated—but alternating—the frame rate of the imaging device will need to be 24 frames per second.

The ability to image the tyre will depend on the geometry of the tyres and the camera location; the speed of the vehicle; the imaging device resolution; the field of view of the imaging device; the exposure time; the lighting conditions; and environmental conditions. The images captured may be colour or greyscale. If colour images are captured, in subsequent evaluation of tread depth, greyscale images may be used in some embodiments.

Operation of the imaging device will typically commence when the wheel reaches a triggering point which can be detected by any known detector system, whether mechanical, optical, magnetic, electric or otherwise. The triggering point can also be used to initiate sequential activation of the flash units.

Whilst it may not be necessary to activate and de-activate the flash units sequentially in order to ensure that only one flash unit at a time is illuminating a tyre whilst an image is being captured, because if two adjacent flash units are activated at the same time the flashes of light will alternate, in some embodiments the flash units are activated and de-activated in sequence. In some embodiments, after a flash unit has been activated, it is then de-activated for a period, for example for up to about a second, before being activated again. In the period of de-activation the flash unit may be recharged.

If the speed of the vehicle is determined, the sequence of activation and de-activation of the flash units sequentially can be time-based. In some embodiments, however, there are sensors to detect when a tyre is in a suitable position for a flash unit to be de-activated and the next flash unit activated.

Typically, the imaging device is a conventional camera which is used to take a series of still images, and preferably a digital camera. However, a video camera could be used and individual frames inspected, or a specialist imaging device used.

It has been found that the overall imaging resolution is dependent on the imaging device resolution, the distance between the imaging device and the target, the viewing angle, curvature distortion and motion blurring. Moving the camera closer to the target improves the "best" resolution but worsens the "worst" resolution. Moving the camera away achieves more consistent performance.

Motion blur increases as the target moves up the tyre, away from the road surface, but surface resolution improves due to the angle of the tyre surface.

A high resolution camera will provide a higher resolution per image, but may be unable to take the images sufficiently quickly to cover the entire periphery of the tyre in one pass.

The highest resolution of the tyre surface will be when the camera is closest to the tyre. However, if the camera is sharply focused when close, the focus further away will be poor. To obtain better average resolution it may be preferred to have a larger minimum focal length but a better depth of field.

A smaller aperture will provide a greater depth of field. In general this might mean that there would then be required stronger illumination and/or a longer exposure time. However, with illumination by bright flashes of light there should be no problems.

It has been determined that when using a camera it is not easy to autofocus and zoom between shots if the tyre is dark between shots. It is thus preferred, in some embodiments, to have a fixed focal length lens, with an aperture that is set sufficiently small to give a depth of field that spans the distance that the vehicle travels for at least one revolution of the wheel, or such other distance travelled whilst images are being captured. The exposure must be sufficiently short to avoid motion blur, and this necessitates the use of a very bright illumination source. However, the invention is not limited to the use of a fixed focal length lens. The imaging device (e.g. camera) may use autofocusing and/or zoom tracking to focus images and/or to zoom in on a desired portion of a tyre at a number of different distances.

In some embodiments, the imaging device is operated to capture multiple images corresponding to a plurality of different portions of the periphery of the tyre whilst the tyre completes at least about 50% of a complete revolution of the tyre; or at least about 55% of a complete revolution of the tyre; or at least about 60% of a complete revolution of the tyre; or at least about 65% of a complete revolution of the tyre; or at least about 70% of a complete revolution of the tyre; or at least about 75% of a complete revolution of the tyre; or at least about 80% of a complete revolution of the tyre; or at least about 85% of a complete revolution of the tyre; or at least about 90% of a complete revolution of the tyre; or at least about 95% of a complete revolution of the tyre; or at least a complete revolution of the tyre.

Where it is stated that images are captured of different portions of the periphery, i.e. spaced around the outer surface of the tyre, this does not imply that there is necessarily a continuous series of images covering the entire periphery of the outer surface of the tyre, although that is a feature of a preferred embodiment of the invention and in that embodiment of the invention there are sufficient images to provide a continuous series which cover substantially the entire outer periphery of the outer surface of the tyre. The images may be of overlapping portions of the periphery i.e. outer surface of the tyre. In an alternative embodiment, the images may be in respect of circumferentially spaced portions of the periphery i.e. outer surface of the tyre, so that there is a discontinuous series of images around the periphery of the outer surface of the tyre. In such an arrangement, the images between them preferably cover at least about 50% of the periphery of the tyre; or at least about 55% of the periphery of the tyre; or at least about 60% of the periphery of the tyre; or at least about 65% of the periphery of the tyre; or at least about 70% of the periphery of the tyre; or at least about 75% of the periphery of the tyre; or at least about 80% of the periphery of the tyre; or at least about 85% of the periphery of the tyre; or at least about 90% of the periphery of the tyre; or at least about 95% of the periphery of the tyre.

In some embodiments of the invention, images are not captured completely up until a revolution has been completed and there may be a gap from the final image captured to the completion of the revolution. In preferred embodiments, images are captured during a continuous period covering at least about 50% of a complete revolution of the tyre; or at least about 55% of a complete revolution of the tyre; or at least about 60% of a complete revolution of the tyre; or at least about 65% of a complete revolution of the tyre; or at least about 70% of a complete revolution of the tyre; or at least about 75% of a complete revolution of the tyre; or at least about 80% of a complete revolution of the tyre; or at least about 85% of a complete revolution of the tyre; or at least about 90% of a complete revolution of the tyre; or at least about 95% of a complete revolution of the tyre; or at least a complete revolution of the tyre.

It will be appreciated that in some circumstances it will not be possible to image at least 50% of the periphery of a tyre, for example when a tyre is obscured by another tyre to the front, or the side, and/or there is structure of the vehicle which obscures the tyre. For a given vehicle there may be some axle spacings which, while being insufficient to allow for imaging the entire circumference of the tyre on the trailing axle, still allow a significant proportion of the periphery of the tyre to be viewed. However, with very closely coupled tyres (e.g. trailers with three close axles, each with twinned tyres), there becomes a point where the gap between the tyres is insufficient to allow line of sight for either the shadow or the imaging device e.g. for the tyre on the centre axle. Either an outer tyre will always obscure the camera's view of the shadow cast on the inner tyre, or vice versa. In such situations the amount of the tyre circumference that can be imaged may be as low as 10% or even less. In that case, the method of the invention is only applicable to other tyres on the vehicle which are not so obscured. The method and apparatus of the invention is still capable of capturing sufficient images of a tyre, even if one or more tyres of a vehicle cannot be imaged sufficiently, or at all, and even if no tyres of a particular vehicle can be imaged sufficiently, or at all.

In embodiments where images are captured of different portions of the periphery during a continuous period covering less than a complete revolution of the tyre, the images will cover only a section of the entire periphery of the tyre. The images may cover the entire section of the periphery of the tyre during that part of the revolution of the tyre, and the images may overlap. In an alternative arrangement the images may be in respect of circumferentially spaced portions of the outer surface of that section of the periphery of the tyre, so that there is a discontinuous series of images around that section of the periphery of the outer surface of the tyre. In such an arrangement, the images between them preferably cover at least about 50% of that section of the periphery of the tyre; or at least about 55% of that section of the periphery of the tyre; or at least about 60% of that section of the periphery of the tyre; or at least about 65% of that section of the periphery of the tyre; or at least about 70% of that section of the periphery of the tyre; or at least about 75% of that section of the periphery of the tyre; or at least about 80% of that section of the periphery of the tyre; or at least about 85% of that section of the periphery of the tyre; or at least about 90% of that section of the periphery of the tyre; or at least about 95% of that section of the periphery of the tyre.

Where it is said that each image is in respect of different portions around the periphery of the tyre, this does not exclude the possibility that two images could be taken in very quick succession so that, in effect, they are in respect of substantially the same portion of the tyre.

Where there is a reference to an image of a portion of the periphery of the outer surface of the tyre, this does not imply that the entire width of the outer surface of the tyre is imaged; and/or that an indication of tread depth is provided in respect of the entire width of the outer surface of the tyre. That is, however, a feature of a preferred embodiment of the invention. In another embodiment only a portion of the width of the outer surface of the tyre is imaged; and/or an indication of tread depth is provided in respect of only a portion of the width of the outer surface of the tyre. This portion of the width of the outer surface of the tyre base could be a percentage of the outer surface of the tyre which will be in contact with a base over which the vehicle is moving. This could be at least the percentage established by any relevant legislation. For example, in the United Kingdom there must be a specified minimum tread depth over the central 75% of the tread. Thus for example, the width imaged and analysed may be at least the central 75% of the tread that will be in contact with the base, or at least about the central 80% of the tread, or at least about the central 85% of the tread, or at least about the central 90% of the tread, or at least about the central 95% of the tread. Expressed in another way, the width imaged and analysed may be at least the central 75% of the outer surface of the tyre that will be used to contact the base, or at least about the central 80% of the outer surface of the tyre that will be used to contact the base, or at least about the central 85% of the outer surface of the tyre that will be used to contact the base, or at least about the central 90% of the outer surface of the tyre that will be used to contact the base, or at least about the central 95% of the outer surface of the tyre that will be used to contact the base.

In some embodiments there could be more than one imaging device to ensure that there is sufficient coverage over the periphery of the tyre. For example, there could be one imaging device positioned to capture images of the forward facing tread surface of oncoming tyres; and a second imaging device positioned to point in an opposite direction so as to the capture images of the rearward facing tread surface of the same or another tyre, whilst it moves away from the second imaging device. Where there are two imaging devices, one to capture images of the rear of the tyre and one to capture images of the front of the tyre, the two series of images could be used together, for example by images of tyre portions captured by the rear camera being interleaved with images of portions captured by the front camera, the portions of the tyre captured by the rear camera being different from the portions of the tyre captured by the front camera.

Additionally or alternatively there could be longitudinally spaced imaging devices which face in the same direction so that one imaging device can capture images over a first part of the path of movement of the vehicle and another imaging device can capture images over a second part of the path of movement of the vehicle.

In some embodiments, the images are used to detect defects in the tread over the outer surface of the tyre, such as cuts, flat spots and bulges. This could be done by manual inspection or by using the data processing apparatus. Additionally or alternatively, the images may include portions of the two sidewalls of the tyre, one on either side of the outer surface of the tyre which is in contact with the base. The images can then be used to detect defects in the sidewalls of the tyre such as cuts or bulges. Again, this could be done by manual inspection or by using the data processing apparatus.

In accordance with the invention, the flash unit is displaced at an acute angle to one side of said path of movement so as to be able to create shadows in the tread gaps of the tyre. The flash unit may be displaced to either side of the path of movement. The imaging device may also be displaced at an acute angle to one side of said path of movement. In that case the imaging device may be displaced to the same side of the path of movement as the flash unit, or to the other side of the path of movement. It would also be possible for the imaging device to face along the path of movement. In this case, the tyre would normally drive over the imaging device, which could for example be spring loaded or mounted under a transparent plate or under a prism so that it is not damaged when the tyre passes overhead.

In some embodiments, a supplementary imaging device is used to capture images of portions of a sidewall of the tyre for example to detect bulges. It might be possible to provide a supplementary flash unit for the supplementary imaging device, but if both this and flash units in the series are operated simultaneously, the arrangement should be that they do not interfere with each other in such a way as to remove or diminish the shadows that are required for putting the invention into effect.

In some embodiments, two supplementary imaging devices are used, one on either side of the outer surface of the tyre. The images can then be used to detect defects in the sidewalls of the tyre. Again, this could be done by manual inspection or by using the data processing apparatus.

In a preferred arrangement, the imaging device is arranged to target a part of the tyre adjacent the base over which the tyre is moving, and extending upwardly for a distance from that base. This is to avoid obstruction by portions of bodywork or other items such as mud flaps.

Vehicles will have a plurality of tyres on one side, and it would be possible to have a plurality of imaging devices which can capture images of different tyres simultaneously. This may be useful where there are closely spaced axles, such as on some heavy goods vehicles. Imaging devices can be spaced longitudinally so that each covers part of the circumference of a tyre. For a car which has a tyre circumference of about 2 m, one camera may be sufficient. For a bus with a tyre circumference of about 4 m, two cameras may be sufficient. For an HGV with a tyre circumference of perhaps about 6 m, more cameras may be required. Some cameras can be directed forwards and some backwards.

In addition, where there are closely spaced axles with multiple wheels, it may be necessary to have an additional arrangement of at least one camera positioned so that it can capture images of partially obscured tyres.

In a preferred arrangement, tyres on both side of a vehicle can be inspected at the same time. Thus preferably, the arrangement of an imaging device and flash unit, or a plurality thereof, to image wheels on one side of a vehicle is repeated on the other side of the vehicle, for example being mirrored.

All of the features discussed above in relation to tyres on one side of a vehicle are equally applicable to tyres on opposite sides of the vehicle.

In some cases a single axle can have two wheels on one side of the vehicle and two wheels on the other side of the vehicle. In this case the outer wheel of a pair may obstruct the inner wheel of the pair. To cope with such an arrangement, it may be desirable to have a first arrangement of flash unit and imaging device to capture images of the outer wheel, and a second arrangement of flash unit and imaging device to capture images of the inner wheel. Again, this could be duplicated on both sides of the vehicle. If two tyres are mounted next to each other on an axle, it may not be possible to image the facing sidewalls of the tyres, at least completely.

In some embodiments, the imaging device and the series of flash units are on opposite sides of the path of movement of the wheel/tyre, i.e. one of the imaging device and the series of flash units is situated on one side of the path of movement of the wheel/tyre and the other is situated on the other side of the path of movement. Thus, the flash units could be arranged to one side, beyond the vehicle, whilst the imaging device is positioned in line with the vehicle; or the reverse arrangement could be used. If tyres on both sides of the vehicle are analysed at the same time, the arrangement could be reproduced on the other side of the vehicle. In one preferred arrangement in which tyres on both sides of a vehicle are analysed, two imaging devices are provided at positions which will be within the outline of the vehicle, whilst the flash units are provided to the sides, outside the outline of the vehicle. Alternatively, the imaging devices could be provided to the sides, outside the outline of the vehicle, whilst the flash units are provided at positions which will be within the outline of the vehicle.

In embodiments of the invention, the angle of the light impinging on the tyre will affect the amount of shadow. If the path of illumination is close to normal to the surface of the tyre, there will be little or no shadow cast and the entire tread gap will be illuminated. If the light shines across the surface of the tyre, the complete tread gap will be in darkness.

If the light extends at a suitable angle to the tread gap, a shadow will be cast which extends down the side of the tread gap, and across the base of the tread gap. The deeper the tread gap, the longer the extent of the shadow down the side of the tread gap and the longer the extent of the shadow across the base of the tread gap, away from the base of the side wall. The length of the shadow down the side of the tread gap may be analysed. Additionally or alternatively, the extent of the shadow across the base of the tread gap may be analysed.

There could be provided a numerical measurement of the tread depth. Additionally or alternatively there could be provided an indication as to whether the tread depth complies with a minimum depth requirement.

In some embodiments of the invention, analysis of an image determines the location of a wheel and tyre combination and then determines the centre of the wheel. This can then be the basis for calculating distances and angles. In putting the invention into effect it has to be borne in mind that the distance to the tyre from the imaging device is changing continuously, so that the scale on the images will change and this has to be taken into account when calculating the actual length of a shadow. This could be done by there being in each image an item which is of known size which can be assessed to set the scale, such as the wheel diameter or radius, or the tyre diameter or radius, and locating the centre of the wheel will assist in this. The tyre or wheel dimension could be known in advance, or could for example be determined by comparing the dimension of the item to a scale mounted at a known distance from the camera, the item and the scale appearing in an image. Thus broadly, a scaling factor is applied by reference to an item of known actual size which is present in each image. The item may be at least a part of the wheel. The dimension of the wheel may be known, and stored. Alternatively the dimension of the wheel is measured. The dimension of the wheel could be measured against a scale which appears in an image with the wheel, in which the wheel and the scale are at the same distance from the imaging device.

An alternative arrangement is to use a calibration step, in which an item having known dimensions is positioned at a known distance from the imaging device. The item could be a chart with markings on it. By viewing an image of the chart or other item at this known distance, a scaling factor can be applied which, for example, will relate the number of image pixels in a particular direction to a real distance. In practice, the known distance from the imaging device will be at the same distance as a device to trigger the commencement of a series of images. Thus, the distance of the tyre from the imaging device, at the time of the first image, will be known.

Where the imaging device is displaced sideways from the path of movement, geometrical calculations can be carried out to determine the distance to the tyre for subsequent images. The angle of the imaging device with respect to the path of movement is fixed. As the vehicle moves along the path of movement the position of an item on the vehicle, such as the tyre or a wheel, will shift across the field of view of the imaging device. By a calibration step or another means, the amount of shift of the item across the field of view—for example measured in pixels—can be related to the distance travelled along the path of movement. Thus, using geometric calculations, it is possible to calculate the distance to the tyre just by inspecting the images, providing there has been suitable calibration.

Account also needs to be taken of distortions caused by the geometry of the arrangement, with the camera displaced to the side of the vehicle which is moving. The camera may be inclined upwardly at the tyre but its path may not be normal to the surface of the tyre. The tyre will have a curved surface and the curvature will depend on the tyre radius In some embodiments, the general procedure involves the following steps:
1) Measure the distance between the tyre and the imaging device in a known geometry.
2) Capture images, whilst operating flash units sequentially, as described above.
3) Filter images to try to eliminate lighting variations,
4) Filter images to try and detect valid groove shadows as opposed to other dark areas.
5) Integrate shadow values.
6) Convert to actual shadow size.
7) Calculate tread depth from shadow size.

In some embodiments of the invention, the vehicle may travel at up to about 30 kilometres per hour (about 18.6 miles per hour or more generally up to about 20 miles per hour), with preferred speeds being up to about 10 kph (about 6.2 mph or more generally up to about 5 mph) or up to about 15 kph (9.3 mph or more generally up to about 10 mph) or up to about 25 kph (15.5 mph or more generally up to about 15 mph). In some embodiments the vehicle should be travelling at a speed of at least about 8 to 10 kph (about 5 to 6 mph).

In some embodiments of the invention, a sensor detects the presence of the vehicle and triggers operation of the imaging device(s) and the flash unit(s). There may be a sensor or sensors for detecting vehicle speed, or the images may be inspected to calculate vehicle speed.

In some embodiments of the invention, typical smaller vehicles, such as cars or vans, pass over the tread depth system in accordance with the invention at speeds of between about 1 and 4.5 metres per second (or approximately 2 to 10 miles per hour) and each flash unit is required to illuminate one metre of the car's path through the system, so the time period during which each flash unit is active is between 0.1 and 1 second. Since nearly all cars have two axles set about 1.5-2.5 m apart, if the flash units are arranged so each covers 1 m of the car's path, there will always be a 1 m zone, where the flash unit is deactivated, between two where it is activated. In a typical system, the flash unit may flash at about 15 to 25 per second, or at about 15 to 20 times a second. The flash unit may flash 15 to 25 times then recharge for 1 second and then flash a further 15 to 25 times.

If cars are queuing to use the system it is possible that the next car could enter the system one second after the first, but this retains the one second on, one second off timing. As the vehicle speed increases the recharge time will be reduced (as the vehicle crosses the 1 m de-activated zone in less time), but at the same time the number of times the flash will need to be fired is reduced accordingly so the required recharge rate is unchanged.

For buses the speed range is similar, but the axles are further apart so the recharge time is greater. Therefore the system will be specified around the worst case, i.e. cars.

Such an arrangement may not be appropriate for measuring the tread depth of large trucks, i.e. heavy goods vehicles (HGVs) because the low speed with which these vehicles will likely cross the system (typically less than about 1 metre per second (or approximately 2 miles per hour) would require bursts of many more flashes and this may be beyond the capacity of the flash unit. The system would in any event need to be reconfigured for HGVs anyway since the slow speed means that the system could take in excess of 200 images of each wheel on each drive over, with the wheel only having moved a very small distance between each of them. Apart from the problem of the amount of storage this large number of images would take up, the time to process them will also take a long time, making the system unresponsive. These issues could be overcome by either reducing a pre-set rate at which the imaging device and flash unit are triggered, to something more suited to the slower trucks, or by measuring the vehicle's speed before it enters the system (for example by using an additional wheel sensor) and adjusting the frame rate dynamically to match the vehicle's speed. If either of these options are implemented then this flash unit will work in a system for HGVs, as the flash burst size will be reduced to less than the maximum it is designed to support. Although the imaging device needs to takes images at twice the rate the flash is fired, the slower speed for these types of vehicles means the actual camera frame rate need not be excessive, even if a dynamic frame rate is implemented.

Thus, in some embodiments of the invention wherein a speed sensing system senses the speed of the vehicle, the rate at which flashes are issued by the flash units and the rate at which images are captured by the imaging device are varied in dependence on the speed of the vehicle. In some embodiments, the rate at which flashes are issued by the flash units and the rate at which images are captured by the imaging device, are at a first value if the speed of the vehicle is below a predetermined speed, and at a second, higher, value if the speed of the vehicle is at or above the predetermined speed. In some embodiments, the rate at which flashes are issued by the flash units, and the rate at which images are captured by the imaging device, are directly related to the speed of the vehicle.

In some embodiments of the invention, a characteristic of the vehicle is determined and the parameters of the system are chosen accordingly before images are captured. The characteristic of the vehicle could be the size of the wheels/ tyres and/or the number of axles and/or the axle spacing, for example. Additionally and alternatively the speed of the vehicle could be determined and the parameters of the system are chosen accordingly before images are captured. Parameters of the system could, for example, include any or all of the length of time for which flash units are activated; the length of time for which flash units are deactivated between being activated; the number of flashes per second produced by a flash unit when activated; the frame rate of the image capturing device; and whether the flashes of adjacent units are out of phase so that flashes are not produced at the same time when the flash units are activated at the same time.

The arrangement could be that for some types of vehicle the method used by the system is in accordance with the first aspect of the invention; whilst for other types of vehicle sequential activation and deactivation of flash units is adequate, without the flashes produced by adjacent flash units being out of phase.

In the case of a physical characteristic of a vehicle itself being determined, the system could choose an appropriate mode of operation. User intervention, for example by a person in charge of the system, could choose an appropriate mode of operation. In the case of the speed of a vehicle being determined, there could be predetermined speed at which the mode of the system changes from one mode to another. The parameters of the system could be varied dynamically so that the parameters vary continuously, or in steps, in accordance with the speed.

Altering the image capture device frame rate in accordance with the detected speed of the vehicle is also applicable to the disclosure of the system of WO2015/059457.

Accordingly, viewed from another aspect, the invention provides a method of assessing the condition of a tyre on a wheel which is mounted on a vehicle, while the vehicle is moving and the tyre is rotating and moving longitudinally along a path of movement, the periphery of the tyre having tread portions separated by tread gaps; in which the method comprises using an imaging device to capture images of a plurality of different portions of the periphery of the tyre whilst the tyre revolves, the images being captured whilst a light source is activated to illuminate the portions of the periphery of the tyre; and the images are analysed to determine the depth of the tread gaps; wherein a series of a plurality of light sources is positioned to one side of the path of movement of the tyre, each light source serving as a point source of non-collimated light and directing light at an acute angle to the path of movement of the tyre; the light sources being spaced from each other in a longitudinal direction;

a control system is configured to activate the light sources sequentially whilst the tyre moves along said path of movement, so that only one of said light sources of the series illuminates a portion of the periphery of the tyre when an image is being captured by the imaging device of that portion of the periphery of the tyre;

when a light source is activated to illuminate a portion of the periphery of the tyre, the light source causes shadows to be cast in the tread gaps between tread portions; the imaging device is operated to capture an image of at least part of the illuminated portion of the periphery of the tyre; and the image is analysed by data processing apparatus which determines the extent of the shadow in a tread gap so as to provide an indication of the depth of the tread gap;

characterised in that the speed of the vehicle is detected and a frame rate at which the imaging device captures images is adjusted in accordance with the detected speed of the vehicle.

In some embodiments of this second aspect of the invention, the rate at which the imaging device captures images is varied dynamically in accordance with the detected speed of the vehicle.

In some embodiments of this second aspect of the invention, each light source is a flash unit, and when a flash unit is activated the flash unit emits a series of flashes of light, and in addition to the frame rate of the imaging device being adjusted in accordance with the detected speed of the vehicle, a flash rate at which the flash units emit flashes of light is also adjusted in accordance with the detected speed of the vehicle.

As discussed above, supplementary imaging devices may be provided to image the side wall of a tyre. Accordingly, in a set of preferred embodiments, the method comprises imaging at least part of a side wall of the tyre using a plurality of longitudinally spaced side wall imaging devices to capture images of a plurality of different portions of the side wall of the tyre whilst the tyre revolves, the images being captured whilst longitudinally spaced side flash units are activated to illuminate portions of the side wall of the tyre, the side flash units being positioned to one side of the path of movement of the tyre and directing light onto the side wall of the tyre at an acute angle to the longitudinal path of movement, wherein each side flash unit causes a series of flashes of light to be produced when the side flash unit is activated, each flash of light in the series being separated from the next flash of light in the series by an interval.

This is novel and inventive in its own right, and so when viewed from a further aspect, the present invention provides a method of imaging at least part of a side wall of a tyre on a wheel which is mounted on a vehicle, while the vehicle is moving and the tyre is rotating and moving longitudinally along a path of movement, in which the method comprises using a plurality of longitudinally spaced side wall imaging devices to capture images of a plurality of different portions of the side wall of the tyre whilst the tyre revolves, the images being captured whilst longitudinally spaced side flash units are activated to illuminate portions of the side wall of the tyre, the side flash units being positioned to one side of the path of movement of the tyre and directing light onto the side wall at an acute angle to the longitudinal path of movement, wherein each side flash unit causes a series of flashes of light to be produced when the side flash unit is activated, each flash of light in the series being separated from the next flash of light in the series by an interval.

When it is said that the side flash units are spaced longitudinally, this does not imply that all of the side flash units lie on a line which is parallel to the path of movement of the tyre, although in some embodiments the side flash units will lie on such a line or on one which is generally parallel to the path of movement of the tyre. However, the side flash units could lie on a line which is somewhat inclined with respect to the parallel direction, or the side flash units may not lie on a line at all. The flash units in the series may be evenly spaced or generally evenly spaced, or there may be variation in the spacing. The side flash units may be grouped, e.g. according to which side wall imaging device will image the position that the side flash unit illuminates.

Similarly, when it is said that the side wall imaging devices are longitudinally spaced, this does not imply that all of the side wall imaging devices lie on a line which is parallel to the path of movement of the tyre, although in preferred embodiments the side wall imaging devices will lie on such a line or on one which is generally parallel to the path of movement of the tyre. However, the side wall imaging devices could lie on a line which is somewhat inclined with respect to the parallel direction, or the side wall imaging devices may not lie on a line at all.

Where it is stated that images are captured of different portions of the side wall, this does not imply that there is necessarily a continuous series of images covering the entire side wall, although that is a feature of some preferred embodiments and in those embodiments there are sufficient images to provide a continuous series which cover substantially the entire side wall. The images may be of overlapping portions of the side wall. Alternatively, the images may be in respect of circumferentially spaced portions of the side wall, so that there is a discontinuous series of images around the side wall of the tyre. Further, where it is said that each image is in respect of a different portion of the side wall, this does not exclude the possibility that two images could be taken in very quick succession so that, in effect, they are in respect of substantially the same portion of the side wall.

Where it is stated that the images are captured whilst the side flash units are activated to illuminate portions of the side wall, it will be understood that this means that images are captured while the flashes of light from the flash units illuminate the side wall.

The following paragraphs set out some preferred features of this aspect of the invention, but it will be appreciated that these features may also be features of embodiments of any other aspect of the invention, where said embodiments incorporate side wall imaging. Further, features described above with reference to other aspects of the invention may also be features of this aspect of the invention. Features of the flash units described above may also be features of the side flash units. Features of the imaging device described above may also be features of the side wall imaging devices.

In some embodiments, the images of the side wall are used to assess damage to the side wall. For example, the images may be used to identify the presence of bulges, cracks, bead cracking, cracking from side wall wear indicators, burst zippers, retread failure, etc. It will be appreciated that it is possible that a side wall of a tyre may become damaged while the tread is still in acceptable condition. Accordingly, it is useful to be able to check the condition of the side wall of a tyre in addition to or independently of the condition of the tyre tread.

In some embodiments, the images of the side wall may be used to read embossed markings on the tyre side wall. Embossed markings may include text, numbers, logos, symbols, pictograms, and any other visual representations of information. Reading the embossed information may include any method of obtaining data from the embossed markings. For example, it may include performing optical character recognition (OCR) to convert the markings into electronic data, e.g. ASCII text. As another example, it may include using image recognition to identify the markings (e.g. a logo or pictogram).

Imaging multiple individual portions of a tyre (rather than, for example, taking a single image of the entire tyre) is advantageous, as better resolution images of the tyre may be obtained, and each portion of the tyre may be optimally lit by the flashes of light in order to cause well-defined shadows to enable embossed text to be more easily read and side wall damage to be more clearly seen.

It will be appreciated that in some embodiments, the method may include both assessing side wall damage and reading embossed markings from a side wall of a tyre. Separate images may be taken for each of these purposes, or the same images may be used for both damage assessment and reading of embossed markings. Preferably the images are analysed by data processing apparatus which identifies damage in the side wall and/or reads the embossed markings on the side wall from the images.

The side flash units are preferably positioned so that the light from the side flash units falling on the tyre causes the damage and/or the embossed markings to cast shadows creating contrasting regions of relative lightness and relative darkness in the image. The detection of damage and/or the reading of embossed markings may be carried out by image analysis software which may identify damage and/or read embossed markings by distinguishing between the contrasting light and dark regions in an image.

The light from the side flash units may be directed on to the side walls using a conical reflector. In some preferred embodiments, a parabolic reflector is used to direct the light onto the side wall. It is desirable to provide bright, even lighting over the area to be imaged. In some embodiments, the area to be imaged is approximately 600 mm wide and 300 mm tall at an angle of approximately 45° to the side wall imaging device. In one example embodiment, a segmented parabolic mirror with flat mirrored sides is used, with a horizontal flash tube at the focal point of the reflector. This casts a bright, short, wide beam in front of the side flash unit that tapers gradually at the left and right sides of the beam. By aiming the middle (i.e. the brightest) part of the beam at the far end of the region to be imaged, this helps to balance the light intensity across the side wall imaging device field of view.

The angle of incidence of the light on the side wall may be chosen so as to optimise the shadows for detection in the images. The angle of incidence refers to the angle between the longitudinal path of movement of the vehicle and the direction of propagation of the light. The direction of propagation in the case of a collimated beam of light refers to the direction of the collimated beam. Where the light is not collimated, e.g. diverging in a conical beam, the direction of the light refers to the general direction of a central portion of the beam direction, e.g. which may be an axis of symmetry of the light beam. In some embodiments, e.g. embodiments using conical reflectors, the angle of incidence of the light is preferably between 30° and 50°, more preferably between 35° and 45°, most preferably about 40°. In some other embodiments, e.g. in embodiments using parabolic reflectors, the angle of incidence of the light is preferably between 20° and 50°, more preferably between 30° and 40°, most preferably about 35°. In some embodiments, the angle of incidence of the light is about 45°.

The side wall imaging devices are preferably positioned so that each side wall imaging device images the same position on the tyre. In preferred embodiments, the side wall imaging devices are positioned to image an upper region of the tyre side wall, e.g. the upper half of the side wall. However, the side wall imaging devices could be positioned to image any position on the tyre side wall. It will be appreciated that as the vehicle moves past each side wall imaging device, the tyre will turn so that different portions of the side wall surface may move into the imaged position for each side wall imaging device. The side wall imaging devices may be positioned at ground level (i.e. at the level of the surface on which the vehicle is driven). The side wall imaging devices may be positioned approximately at the height of the side wall portion to be imaged. The side wall imaging devices may be oriented to face the imaged region (e.g. parallel to the tyre rotation axis and in line with the imaged region). The side wall imaging devices may be at an angle to the tyre rotation axis (e.g. angled upwards, e.g. at 45° to the vertical, if they are positioned at or near the ground).

The side wall imaging devices are preferably spaced so that the imaged portions together cover all or substantially all of the side wall. It will be appreciated that the distance travelled by the tyre to bring a particular portion of the side wall into view for an imaging device depends on the circumference (and therefore on the diameter) of the tyre. Accordingly, the side wall imaging device positions may be chosen depending on the vehicle wheel size that the apparatus is intended to measure. However, in preferred embodiments, the side wall imaging devices have a sufficiently wide field of view for a wide range of tyre sizes to be accommodated. It will be appreciated that the portions imaged by different side wall imaging devices may overlap, and that the extent of the overlap may vary with tyre size.

In some embodiments, two side wall imaging devices are used on each side of the vehicle—for example, in embodiments in which each side wall imaging device images the upper half of a tyre side wall. In such embodiments, the side wall imaging devices may be spaced so that the distance between them corresponds to a rotation of the tyre of approximately 180°.

However, in some embodiments more than two side wall imaging devices may be used. For example, three, four, five, six or more than six may be used. Using a higher number of side wall imaging devices may be particularly advantageous in embodiments in which wheels of significantly different sizes are to be measured. For example, large wheels will travel a greater distance in a single rotation than small wheels, and so more imaging devices spread over a greater distance may be necessary to capture the entire side wall of very large wheels.

Preferably, each side wall imaging device takes multiple images of the side wall as the tyre rolls past. Depending on the size of the tyre, by using multiple images, each side wall imaging device may capture a major sector of the tyre side wall.

In some embodiments, one flash unit is used per side wall imaging device. Flash units having parabolic reflectors are particularly suited for this. In such embodiments, one flash unit may provide sufficient illumination to illuminate completely the part of the tyre that is within the field of view of the side wall imaging device as the tyre rolls past.

In other embodiments, more than one flash unit is used per side wall imaging device. For example, two flash units may be used per side wall imaging device. This may be used, for example, in embodiments where a particular type of flash unit cannot provide sufficient illumination across the full distance travelled by the tyre within the field of view of a single side wall imaging device, and so two flash units can be used to cooperate to achieve this.

Where a flash unit provides a beam having a brighter region, e.g. a conical beam, the flash unit may be angled so that the brightest part of the beam is directed on the most distant part of the side wall. This can help to provide more even illumination by compensating for the reduced intensity of the beam as it diverges with distance.

It will be appreciated that it is desirable to be able to image the side wall of more than one (e.g. of each) tyre on a vehicle, e.g. to check each tyre on a vehicle for damage. Accordingly, in some embodiments, the method is carried out for more than one tyre of a vehicle as each tyre passes the side flash units and side wall imaging devices. It will be appreciated that, particularly for vehicles with axles that are close together, this may result in adjacent side flash units being activated at the same time, creating a region of overlapping illumination where two flash units illuminate a region of a side wall at the same time. As in the case of tread depth measurement in accordance with the invention, it is desirable to prevent illumination of an imaged region by more than one flash at a time, as this may prevent the formation of well-defined shadows that can be easily imaged.

Accordingly, in preferred embodiments, for any side flash units that are activated at the same time and which illuminate overlapping regions of the side wall of a tyre, the respective series of flashes of light from the side flash units are out of phase so that the flashes of light from one side flash unit are emitted in the intervals between the flashes of light from the or each other flash unit.

Similarly, in embodiments in which the side wall imaging is combined with tread imaging as described above, for any side flash unit which is activated at the same time as a flash unit, and which illuminates a region of the tyre surface that overlaps with a portion illuminated by the flash unit, the respective series of flashes of light are preferably out of phase so that the flashes of light from the side flash units are emitted in the intervals between the flashes of light from the flash units.

It is not necessary for the side flash units to be out of phase with each other and/or with the flash units, but having the side flash units out of phase may help to reduce lens flare and to make tyre isolation and tracking easier. This may be particularly the case for vehicles with axles that are close together, In preferred embodiments, the images are analysed using image analysis software. Damage on the side wall may be detected and/or assessed using the software. In preferred embodiments, image analysis software is used to read the embossed markings on the side wall. Information about the tyre and its specification may thereby be determined from the embossed markings, e.g. the tyre size, make (e.g. brand), manufacturer, date of manufacture, load, speed rating, etc. may be determined. This is particularly advantageous when the method is combined with tread depth measurement and/or tyre pressure measurement, as information relating to the tyre (e.g. the brand, specification, size, etc.) can be provided to algorithms that use this information in calculating the tread depth and/or tyre pressure. Information obtained from reading the embossed markings may also be used in an algorithm relating to assessment of defects in the side wall and/or defects in the tyre tread.

In addition to or as an alternative to software-based image analysis, a visual review of the images may be carried out by a person, e.g. by a mechanic or the vehicle user/owner. The images may be transmitted to a third party (e.g. a mechanical turk) for visual analysis.

Images of the side walls, tread and/or vehicle may be provided (e.g. on a screen or as a printout) to a vehicle user/owner, e.g. at a kiosk adjacent to the side wall imaging system. Tyre information obtained from the embossed markings may also be provided to the vehicle owner/user as a reference of the type and make of tyres currently installed. The tyre information could also advantageously be used to identify suppliers and/or supplier locations where replacement tyres can be purchased, e.g. by determining which local businesses supply a tyre brand that is needed for a replacement.

Implementation of a method in accordance with any aspect of the invention which utilises flash units may be carried out by apparatus as described in accordance with WO2015/059457, but with flash units being the light sources and there being a timing unit which creates timing pulses for the flash units and for the imaging device(s).

Accordingly, viewed from another aspect, the present invention extends to a system for assessing the condition of a tyre on a wheel which is mounted on a vehicle, while the vehicle is moving and the tyre is rotating and moving longitudinally along a path of movement, the periphery of the tyre having tread portions separated by tread gaps; the system comprising:
longitudinally spaced flash units positioned to one side of the path of movement of the tyre and directing light at an acute angle to the path of movement of the tyre, the light causing shadows to be cast in the tread gaps between tread portions;

an imaging device arranged to capture images of a plurality of different portions of the periphery of the tyre whilst the tyre revolves, the images being captured whilst the longitudinally spaced flash units are activated to illuminate portions of the periphery of the tyre; and a data processing apparatus arranged to analyse the images and determine the extent of shadows in the tread gaps so as to provide an indication of the depth of the tread gaps;

wherein each flash unit causes a series of flashes of light to be produced when the flash unit is activated, each flash of light in the series being separated from the next flash of light in the series by an interval;

characterised in that for any flash units which are activated at the same time and illuminate overlapping portions of the periphery of tyre, the respective series of flashes of light are out of phase so that the flashes of light from one flash unit are emitted in the intervals between the flashes of light from the or each other flash unit.

When viewed from yet another aspect, the present invention extends to a system for assessing the condition of a tyre on a wheel which is mounted on a vehicle, while the vehicle is moving and the tyre is rotating and moving longitudinally along a path of movement, the periphery of the tyre having tread portions separated by tread gaps; the system comprising:

a series of a plurality of light sources positioned to one side of the path of movement of the tyre, each light source serving as a point source of non-collimated light and directing light at an acute angle to the path of movement of the tyre; the light sources being spaced from each other in a longitudinal direction and activated to illuminate a portion of the periphery of the tyre whilst the tyre revolves, wherein the light source causes shadows to be cast in the tread gaps between tread portions;

an imaging device arranged to capture an image of at least part of the illuminated portion of the periphery of the tyre whilst the tyre revolves;

a data processing apparatus arranged to analyse the image and determine the extent of the shadow in a tread gap so as to provide an indication of the depth of the tread gap; and a control system configured to activate the light sources sequentially whilst the tyre moves along said path of movement, so that only one of said light sources of the series illuminates a portion of the periphery of the tyre when an image is being captured by the imaging device of that portion of the periphery of the tyre;

characterised in that the speed of the vehicle is detected and a frame rate at which the imaging device captures images is adjusted in accordance with the detected speed of the vehicle.

When viewed from yet another aspect, the present invention extends to a system for imaging at least part of a side wall of a tyre on a wheel which is mounted on a vehicle, while the vehicle is moving and the tyre is rotating and moving longitudinally along a path of movement, the system comprising:

longitudinally spaced side flash units positioned to one side of the path of movement of the tyre and directing light onto the side wall at an acute angle to the longitudinal path of movement; and a plurality of longitudinally spaced side wall imaging devices arranged to capture images of a plurality of different portions of the side wall of the tyre whilst the tyre revolves, the images being captured whilst the longitudinally spaced side flash units are activated to illuminate portions of the side wall of the tyre, wherein each side flash unit causes a series of flashes of light to be produced when the side flash unit is activated, each flash of light in the series being separated from the next flash of light in the series by an interval.

Any of the features described hereinabove in relation to any of the embodiments of the invention may be applied equally to such systems.

Some embodiments of the invention will now be described by way of example and with reference to the accompanying drawings, in which:

FIG. 1 is a diagram of an embodiment of a system used for carrying out the invention;

FIG. 2 is a side view of a tyre being imaged;

FIG. 3 is a front view of a tyre being imaged;

FIG. 4 shows a portion of a vehicle tyre;

FIG. 5 shows how a shadow is formed;

FIG. 6 shows an alternative configuration for mounting an imaging device;

FIG. 7 is a diagram illustrating a system of distance measurement;

FIG. 9 shows the sequence of two flash units being activated and deactivated;

FIG. 10 illustrates the timing of flashes when flash units are activated;

FIG. 15 shows a series of images of portions of tyre side walls obtained using a first camera;

FIG. 16 shows a series of images of different portions of the tyre side walls of FIG. 15, obtained using a second camera;

FIG. 17 shows the respective sectors of the tyre covered by the two image series of FIGS. 15 and 16;

Figure 8:
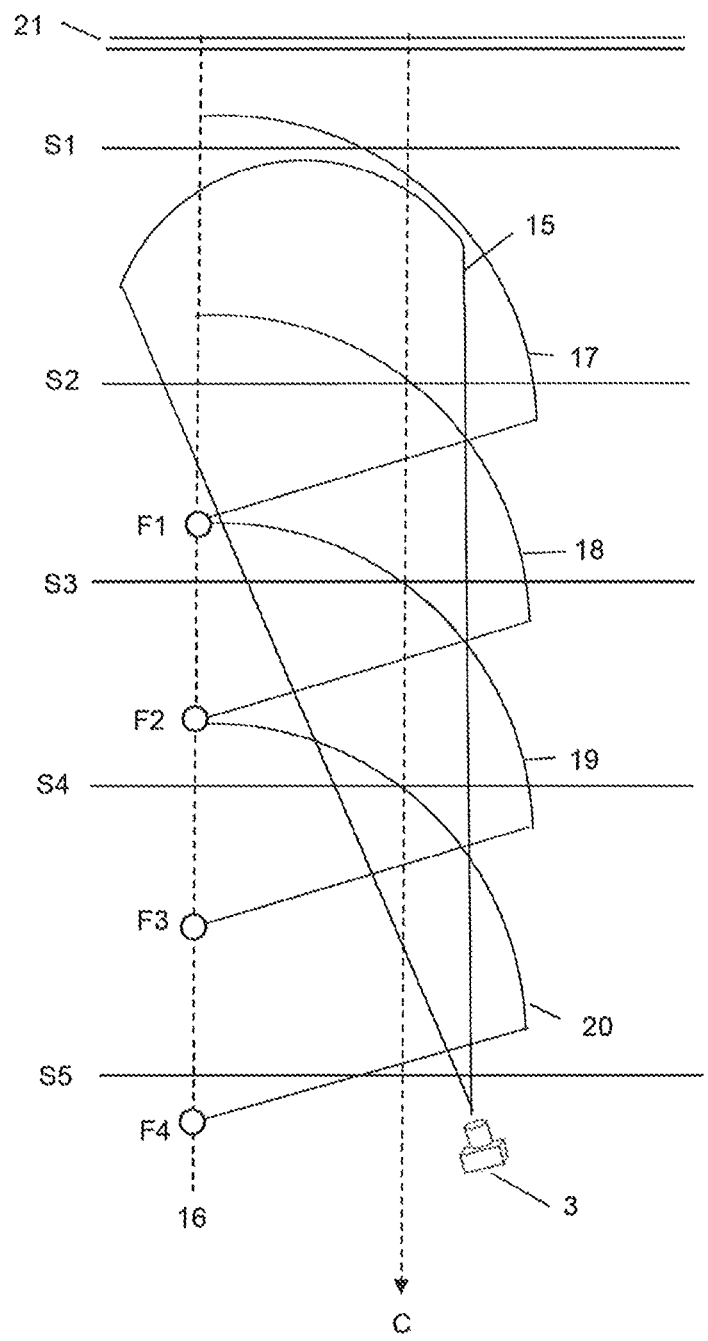
FIG. 8 shows in detail the arrangement of flash units, imaging device and sensors.

Referring now to the Figures, which show apparatus for putting the aspects of the invention into effect, FIG. 1 is an illustration of a first embodiment of a system, in diagrammatic form. A truck 1 has ten wheels indicated at 2, and is travelling in a direction indicated by arrow A. Positioned below the level of the truck body are two imaging devices in the form of digital still cameras 3 and 4, respectively directed at an acute angle at wheels on the left hand side of the truck and the right hand side of the truck. A first series of flash units F1, F2, F3 and F4 are arranged longitudinally spaced along a line running generally parallel to the path of movement of the truck, outside the left hand side of the truck. A second series of flash units F5, F6, F7 and F8 are arranged longitudinally spaced along a line running generally parallel to the path of movement of the truck, outside the right hand side of the truck. Each flash unit consists of two xenon flash tubes, described in more detail below, and effectively operates as a single source of light.

With reference to FIG. 2, the wheel 2 is fitted with a pneumatic rubber tyre 5 and rotates in the direction of arrow B, whilst moving in a longitudinal direction over a base 6 as indicated by arrow A. Both cameras image a region 7 of the tyre beneath the bodywork of the truck 1. In FIG. 2, the right hand side of the vehicle is illustrated diagrammatically, with camera 4 shown; the other side corresponds. FIG. 3 illustrates diagrammatically the left hand side, showing how the flash unit F4 is used to illuminate the region 7 of the tyre, whilst the camera 3 captures an image. The operation of the flash units, such as F4 shown in FIG. 3, and the cameras, such as camera 3 shown in FIG. 3 are controlled by a data processing unit 8, which also receives the image data from the cameras and can manipulate the data and calculate tread depths. Image data and other data can be displayed on a screen 9.

FIG. 4 shows a portion of the tyre 5, which has blocks of tread 10 separated by gaps 11. FIG. 5 shows how shadows are formed when the surface of the tyre 5 is illuminated by a flash unit such as F1. There is a shadow portion 12 extending down the side of the tread gap 11, and a shadow portion 13 extending part way across the base. As the depth of the tread gap 11 becomes less, with wear of the tyre, both shadows shorten.

As the wheel rotates, different portions of the surface of the tyre come successively into the fields of view cameras 3 and 4. The flash units are operated under the control of the data processing unit 8. It will be appreciated that the data processing unit could comprise a number of separate pieces of equipment linked together to perform the functions required by a method in accordance with the invention.

FIG. 6 show an alternative arrangement similar to FIG. 2, in which the camera 4 is recessed below the surface 6. The camera may be covered by a window 14 of toughened glass or the like, so that it will not be damaged by the wheel and tyre passing overhead.

FIG. 7 illustrates a system for detecting the distance of an object O. An observation plane OP is arranged at an acute angle ø to the path of movement B of a tyre. The distance D1 from the observation plane to a starting point, P1, where the taking of images is triggered, is known from a calibration step. When the object O has moved along the path of movement A to a point P2, the distance D2 of the object from the observation plane OP is related to the distance L across the observation plane OP by the following:

$$D2=D1-L\times\cot an\,ø$$

Accordingly, if the distance L is measured, the distance D2 can be calculated. In practice a camera will be positioned on the observation plane and the true distance L will be related to the distance apparent on the image, such as a number of pixels. The direction the lens of the camera is facing will be at the angle ø to the path of movement B. The object O could be anything suitable, such as the centre of the wheel as identified in the images.

FIG. 8 shows the arrangement of the camera 3 and the flash units F1 to F4 in more detail. The arrangement for the camera 4 and flash units F5 to F8 corresponds. The path of travel of a tyre being imaged is indicated at C. The field of view of the camera is indicated by segment 15 and is arranged so that over a considerable length of its path or travel, the tyre lies within this field of view. The flash units F1 to F2 are positioned at equal spacings along a line 16 which is parallel to line of travel C of the tyre, and displaced to the left of that line of travel.

The flash units F1, F2, F3 and F4, illuminate segments marked respectively as 17, 18, 19 and 20. These segments of illumination overlap and are directed at acute angles to the path of travel of the tyre. Between them, the segments of illumination cover the entire path of travel of the tyre which falls within the field of view of the camera.

Also provided at spaced intervals along a line parallel to the path of travel of the tyre, are sensors S1, S2, S3 and S4 which detect the presence of the wheel/tyre. The sensors are all in communication with the data processing 8. Initially, the flash units F1 to F4 are not activated. As the tyre enters the system, it triggers sensor S1. This communicates with the data processing unit and activates flash unit F1. As the tyre moves forwards, it triggers sensor S2, which causes flash unit F2 to be activated. As the tyre moves further forwards, it triggers sensor S3, which causes flash unit F3 to be activated. As the tyre moves further forwards, it triggers sensor S4, which causes flash unit F4 to be activated.

Once a flash unit has been activated it produces a series of flashes of light for a predetermined period of time, at a predetermined flash rate, for example generating a burst over a period of about 0.1 second to about 1 second, at a flash rate of about 25 flashes per second, i.e. flashes fired at 40 ms intervals. The width of each flash pulse will be, for example, between 135 µs and 150 µs. The flash unit will then be deactivated to provide time to recharge. Typically this may take about a second and in some embodiments the flash unit will be activated for about a second and then deactivated for at least about a second before being activated again. In some cases a flash unit will not be activated again unless another tyre is detected by the associated sensor.

The arrangement is such that the flash pulses produced by flash unit F2 are generated in the spaces between the individual pulses produced by flash units F1 and F3; and the flash pulses produced by flash unit F4 are generated in the spaces between the individual pulses produced by flash unit F3. Thus two adjacent flash units do not produce individual pulses at the same time and a portion of a tyre is not illuminated by two flash units at the same moment in time. For this reason, it is not necessary to deactivate one flash unit when the tyre moves into an area of overlap between the coverage of two flash units, before the next flash unit in the series is activated.

Finally a fifth sensor S5 is provided which detect the presence of the wheel/tyre as it leaves the region where images are being captured.

In appropriate cases, for example with cars as opposed to trucks, it would be possible to operate the system in an alternative mode in accordance with the method of WO2015/059457, in which the flash units are activated and de-activated sequentially as described in that document, and without the flash units being arranged so that when activated at the same time, the flashes produced by one unit are out of phase with the flashes produced by an adjacent unit in the series.

As shown in FIG. 8, before the vehicle encounter the main sensors S1 to S5, it passes over a speed sensor 21, which can be in the form of two closely spaced road mounted pressure switches. This can feed speed information to the data processing unit 8, to adjust the parameters of the system. This sensor may also provide information about the number of axles and the spacing between the axles. Additionally there may be a further image capturing device 22, which captures data about the vehicle which can also be fed to the data processing unit 8 to identify the type of vehicle. In an alternative arrangement, since the distance between sensor 21 and sensor S1 is known, this can be used to detect the speed. As the distances between all of the sensors S1 to S5 are known, a check can be kept on speed as a vehicle progresses.

The data processing unit contains a module which produces signals which are fed to the flash units F1 to F8 and to the imaging devices 3 and 4. These signals control when the imaging device captures images; when the flash units are activated and de-activated; and the timing of the individual pulses when a flash unit is activated. The image capture device must be synchronised with the production of the individual flashes of light when flash units are activated.

FIG. 9 shows the sequence of activation and deactivation of the flash units F1 and F2, with respect to time. The flash unit F1 has periods 23 of activation, lasting for one second, alternating with periods 24 of de-activation lasting for one second.

Flash unit F2 has periods 25 of activation, lasting for one second, alternating with periods 26 of de-activation lasting for one second. The activation periods 25 of flash unit F2 are displaced in time from the activation periods 23 of flash unit F1, as activation of F2 commences later than activation of F2. Although the activation periods of F1 and F2 are displaced, there is a zone marked 27 where both flash units are activated.

FIG. 10 shows zone of overlap in more detail. When flash F1 is activated, for periods 23, the flash unit F1 emits a series of pulses of light P, which are separated by intervals G. There is then a period 24 of deactivation when no pulses are emitted. Flash unit F2 remains in a period 26 of deactivation after flash unit F1 has been activated, but whilst flash unit F1 is still in a period of activation 23, flash unit F2 enters a period of activation 25 and this results in a region of overlap 27 when both flash units F1 and F2 are in a state of activation. When activated, flash unit F2 also emits a series of pulses of light P, which are separated by intervals G, and the profile of this series of pulses matches that of flash unit F1. However, the series of pulses emitted by flash unit F2 when activated, is out of phase with the series of pulses emitted by flash unit F1 when activated, so that the pulses P emitted by flash unit F2 are emitted in the intervals G between pulses emitted by flash unit F1, and vice versa. Thus, although there is a period of overlap 27 when both flash units F1 and F2 are activated, the pulses of the two flash units do not coincide. In this manner, the tyre is not illuminated by two flash units at the same time.

Figure 11:
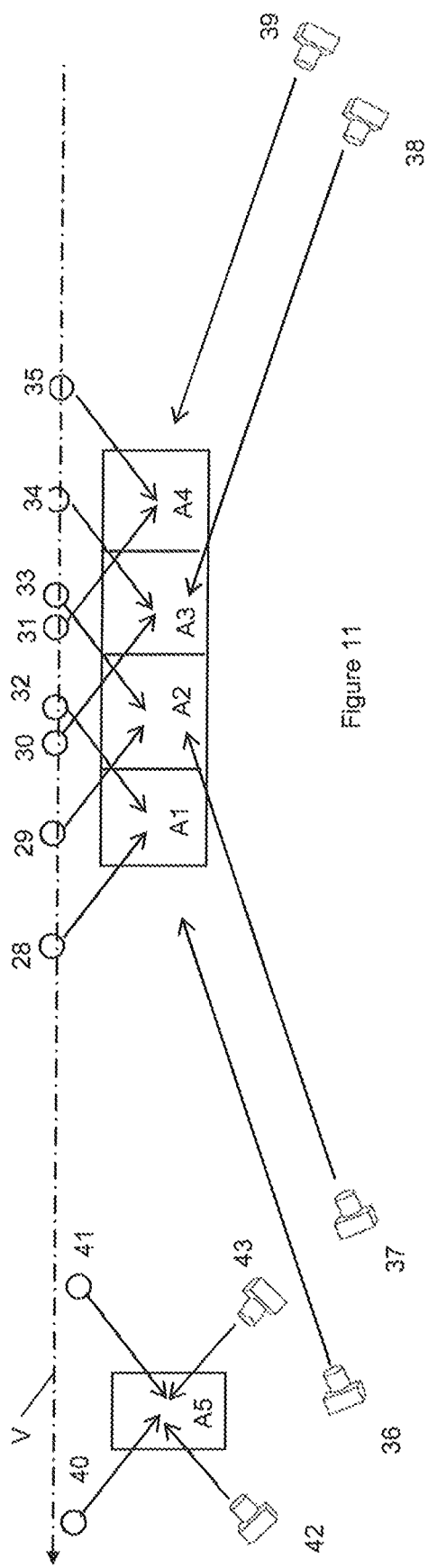
FIG. 11 shows a layout of a system for use with a heavy goods vehicle (HGV)

FIG. 11 shows a layout of a system for use with a heavy goods vehicle (HGV). V represents a centre line V of a vehicle which is moving. Target areas for imaging are shown as A1, A2, A3 and A4. These are illuminated by four longitudinally spaced, rearward facing flash units 28, 29, 30 and 31 which are arranged along the centre line V, respectively illuminating primarily target areas A1, A2, A3 and A4.

The target areas are also illuminated by four longitudinally spaced forward facing flash units 32, 33, 34 and 35, respectively illuminating primarily target areas A1, A2, A3 and A4. The flash units are operated in sequence as noted earlier, and the flashes are out of phase as necessary if they are activated at the same time. In addition to any other phase differences that are required, the rear facing flash units may be operated out of phase with the front facing flash units, so that each rear flash unit is initiated at a $\frac{1}{50}^{th}$ delay with respect to the front facing camera units.

Images are captured by rear facing cameras 36 and 37, and front facing cameras 38 and 39.

There is an additional target area A5, provided with rear facing flash unit 40 and front facing flash unit 41; as well as rear facing camera 42 and front facing camera 43. They provide a close coupled system closer to the wheels of a vehicle, which can image difficult areas. Typically the amount of coverage is limited but at least some images can be captured.

Figure 12:
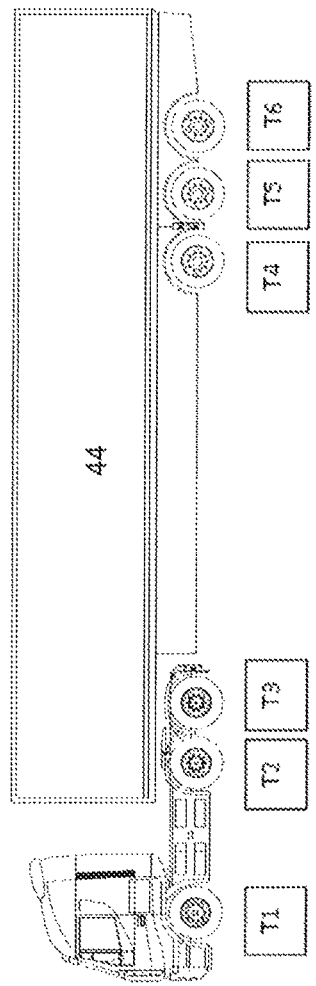
FIG. 12 shows an HGV which is driven through the system illustrated in FIG. 11.

FIG. 12 shows an HGV 44 which is driven through the system illustrated in FIG. 11. The arrangement is duplicated for the other side of the vehicle by a mirror image of the arrangement shown in FIG. 11. There are shown six outer wheels and tyres, T1, T2, T3, T4, T5 and T6. Tyre T5 is likely to be a difficult one to image as it is obstructed by tyres T4 and T6. Table 1 below, shows how much of each tyre the cameras can image and the total coverage for each tyre.

TABLE 1

| Camera | Coverage (°) | | | | | |
|---|---|---|---|---|---|---|
| | Tyre 1 | T2 | T3 | T4 | T5 | T6 |
| 36 | 180 | 180 | 0 | 180 | 0 | 0 |
| 37 | 180 | 180 | 0 | 180 | 0 | 0 |
| 38 | 0 | 0 | 180 | 0 | 0 | 180 |
| 39 | 0 | 0 | 180 | 0 | 0 | 180 |
| 42 | 10 | 10 | 10 | 10 | 10 | 10 |
| 43 | 10 | 10 | 10 | 10 | 10 | 10 |
| Total | 360 | 360 | 360 | 360 | 20 | 360 |

It can be seen that the system provides coverage around the circumference for all tyres except T5, where the close coupled system provides 20° of coverage and the other cameras cannot image the tyre at all.

Figure 13:
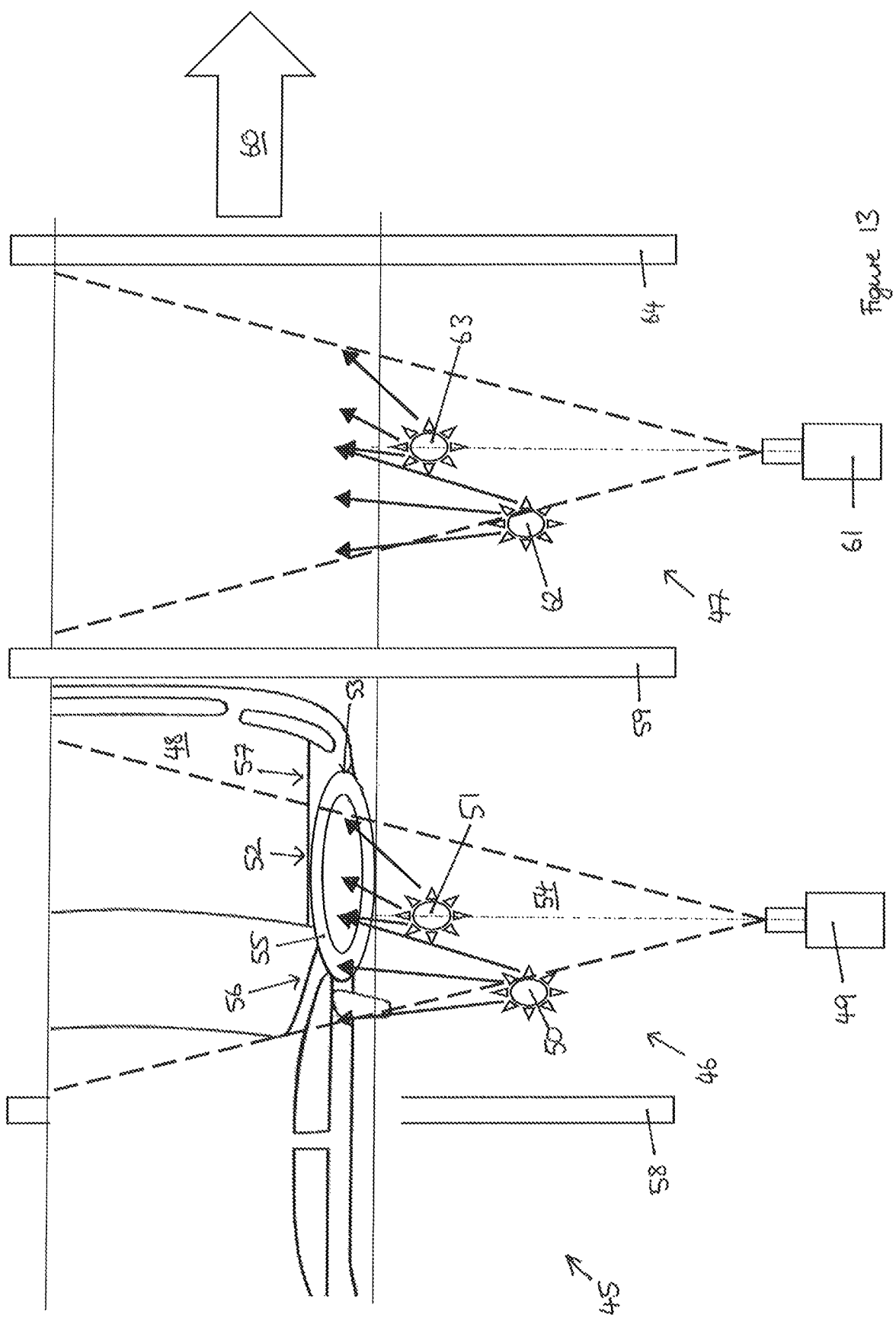
FIG. 13 shows an embodiment of a side wall imaging system in accordance with aspects of the present invention.

FIG. 13 shows a schematic top view representation of an embodiment of a side wall imaging system 45 in accordance with aspects of the present invention. The imaging system 45 comprises a first imaging section 46 and a second imaging section 47 for imaging a wheel on a vehicle 48 as it drives past. The first imaging section 46 comprises a first camera 49 and first and second flash units 50, 51.

First camera 49 is positioned so that the top half 52 of the vehicle tyre 53 passes through the camera's field of view 54 as the vehicle 48 drives past.

First and second flash units 50, 51 are positioned to illuminate the side wall 55 of the vehicle tyre 53. The first flash unit 50 is positioned to illuminate a near end 56 of the tyre 53, while flash unit 51 is positioned to illuminate a far side 57 of the tyre 53. Illumination across the tyre 53 while the vehicle 48 drives past can thus be achieved by activating both side flash units 50, 51 at the same time.

The first and second flash units 50, 51 are positioned to direct flashes of light on to the side wall 55 surface at an angle of approximately 40° to the vehicle direction of travel (shown by arrow 60). In variations on this embodiment, the angle of incidence of the light to the direction of travel is in the range 30° to 50°, although other angles are possible.

The illumination from the flashes causes shadows to be cast by embossed markings on the side wall 55 surface and by any damage in the side wall 55, such as cracks or bulges.

A first sensor 58 detects when the vehicle is approaching the field of view 54 of the first camera 49, and then activates the flash units 50, 51 and the camera 49 to begin the imaging process as the vehicle passes the sensor 58. A second sensor 59 detects when the vehicle has exited the field of view 54 of the first camera 49, and deactivates the first camera 49 and the first and second flash units 50, 51.

The first camera is positioned approximately 1.8 metres from the position of the vehicle tyre 53 when the system is in use. At this distance, the field of view of the camera is approximately 0.5 metres across. The first and second flash units are positioned approximately 0.5 metres and 0.2 metres respectively from the tyre when the system is in use. Having one side flash unit closer to the tyre than the other flash unit provides the advantage that the closer flash unit can illuminate tyres that are smaller and farther anyway.

As the vehicle 48 continues in the direction of travel shown by the arrow 60, the vehicle 48 moves into the second imaging section 47. The second imaging section 47 comprises a second camera 61 and third and fourth flash units 62, 63. These components are arranged in the same manner as the first camera 49 and the first and second flash units 50, 51 of the first imaging section 46, but laterally displaced in the direction of travel by approximately 1 metre. The second sensor 59, which detects that the vehicle has left the first imaging section 46, also serves to determine that the vehicle has entered the second imaging section 47. When this happens, the second camera 61, and the third and fourth flash units 62, 63, are activated in a similar manner to that described previously with reference to the first imaging section 46.

As the vehicle travels the distance between the first camera's field of view and the second camera's field of view, the tyre 53 rotates so that a different portion of the side wall 55 is positioned at the top of the tyre. Accordingly, the portion of the side wall 55 that is in the field of view of the second camera 61 is different from the portion that was in the field of view of the first camera 49. In this way, the second camera 61 is able to image a different portion of the side wall 55 from that imaged by the first camera 49.

A third sensor 64 detects when the vehicle has moved out of the field of view of the second camera 61, and deactivates the second camera 61 and the third and fourth flash units 62, 63 when the vehicle exits the second imaging section 47.

The cameras 49, 61 are JAI GigE GO-5000M-PGE cameras, which record at 23 frames per second, with a camera exposure of 200 microseconds at 5 megapixels, and use a 50 mm lens (e.g. Kowa LM50HC-SW 14.50 horizontal view with 1" sensor). It will be appreciated that different cameras with other specifications could be used in this or in other embodiments.

Figure 14:
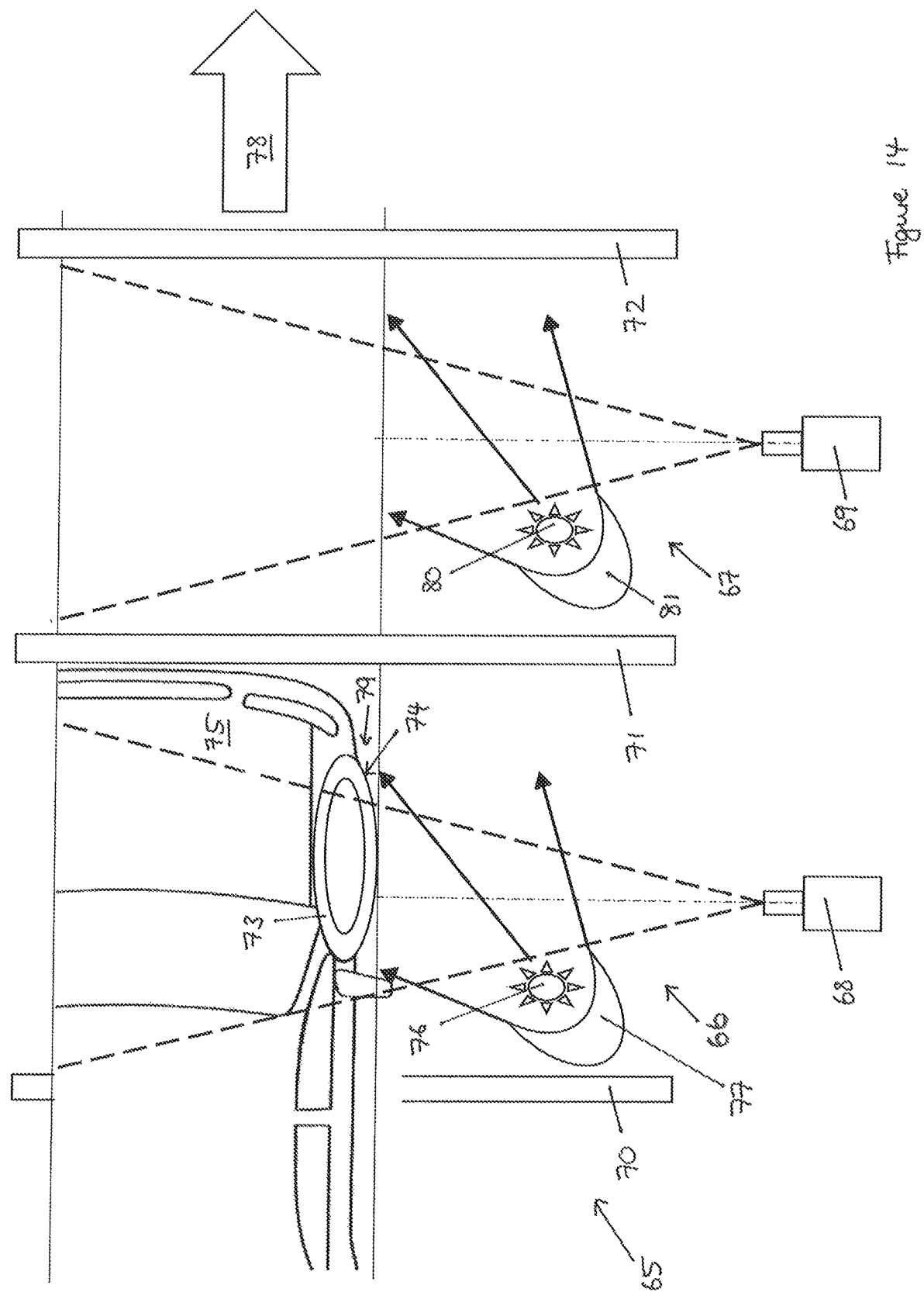
FIG. 14 shows an alternative embodiment of a side wall imaging system in accordance with aspects of the present invention.

FIG. 14 shows an alternative embodiment of a side wall imaging system 65. The system 65 comprises a first imaging section 66 and a second imaging section 67. The first and second imaging sections 66, 67 comprise respective first and second camera 68, 69, which are arranged in the same manner as the first and second cameras in the embodiment of FIG. 13. The imaging system 65 also comprises first, second and third sensors, 70, 71, 72 which are arranged and function in the same manner as the sensors of FIG. 13. The imaging system 65 functions in the same manner as the imaging system 45 of FIG. 13 to image the side wall 73 of a tyre 74 on a vehicle 75, except that only one flash unit is provided in each imaging section, i.e. there is one flash unit per camera.

First flash unit 76 in the first imaging section 66 is provided with a first parabolic reflector 77 and is positioned and angled so as to direct a beam of light onto the tyre 74 at an angle of incidence of approximately 35° to the vehicle's direction of travel as indicated by the arrow 78. In some other embodiments using parabolic reflectors, the angle of incidence is between 20° and 50°, although other angles are possible.

The light beam produced by the first flash unit 76 is directed by the first parabolic reflector 77 towards a far end 79 of the tyre 74. This helps to produce a more even intensity of light over the side wall surface as the brightest part of the light beam is directed onto the farthest part of the tyre. The use of the parabolic reflector 77 means that the illumination provided by the single flash unit 76 is sufficient to illuminate the entire side wall. This is in contrast with the embodiment of FIG. 13, where two flash units without parabolic reflectors are used to fully illuminate the portion of the side wall that is imaged by the camera. The parabolic reflector 77 also enables tyres that are smaller and/or farther away to be illuminated without the need for two side flash units per tyre. In other embodiments, e.g. the embodiment of FIG. 13, this may be achieved by having a side flash unit positioned closer to the vehicle.

In the second imaging section 67, a second flash unit 80 is provided, with a corresponding second parabolic reflector 81. The second flash unit 80 and second reflector 81 are arranged in the same position as the first flash unit 76 and the first reflector 77, except that they are displaced laterally approximately 1 metre in the direction of travel 78. The second imaging section 67 thus operates in an equivalent manner to the first imaging section 66, but as the tyre has rotated due to the vehicle moving forward (as explained above), a different portion of the side wall 73 is imaged by the second camera 69.

The systems shown in FIGS. 13 and 14 may be combined with tread depth measuring systems and/or tyre pressure measuring systems, but other systems are omitted from these Figures for clarity.

FIG. 15 shows a series of images obtained using the first camera in the embodiment shown in FIG. 14. Each of the successive images shown in FIG. 15 corresponds to a frame of the recording of the first camera. It will be appreciated that not all of the images captured by the camera are shown in FIG. 15, as the first camera records at 23 frames per second. The images selected represent a range of image capture times from the point at which the tyre enters the camera's field of view to the time that its leaves.

Each image in FIG. 15 shows the upper part of a wheel 82 with its tyre 83 under the vehicle wheel arch 84. In the middle image the text 85 "UNIROYAL" is visible, indicating that the tyre is of the Uniroyal™ brand. In the far left image of FIG. 15, additional embossed markings are also visible, which can be read from the images using image analysis software. The data extracted from this text can be used to identify the tyre specification.

FIG. 16 shows a similar series of images taken using the second camera in the embodiment of FIG. 14. Between the first and second cameras, the wheel has rotated as the vehicle moved forward and so the images of FIG. 16 show the portion of the side wall that is not visible in the images of FIG. 15.

FIG. 17 shows two images of the wheel 82 that has been imaged in FIGS. 15 and 16. In the left image, a dotted line shows the major sector imaged by the first camera, as shown in FIG. 15. In the right image, a dotted line shows the major sector imaged by the second camera, as shown in FIG. 16. It can be seen from these images that the images of the first and second camera together cover the entire tyre side wall, with some overlap.

Figure 18:
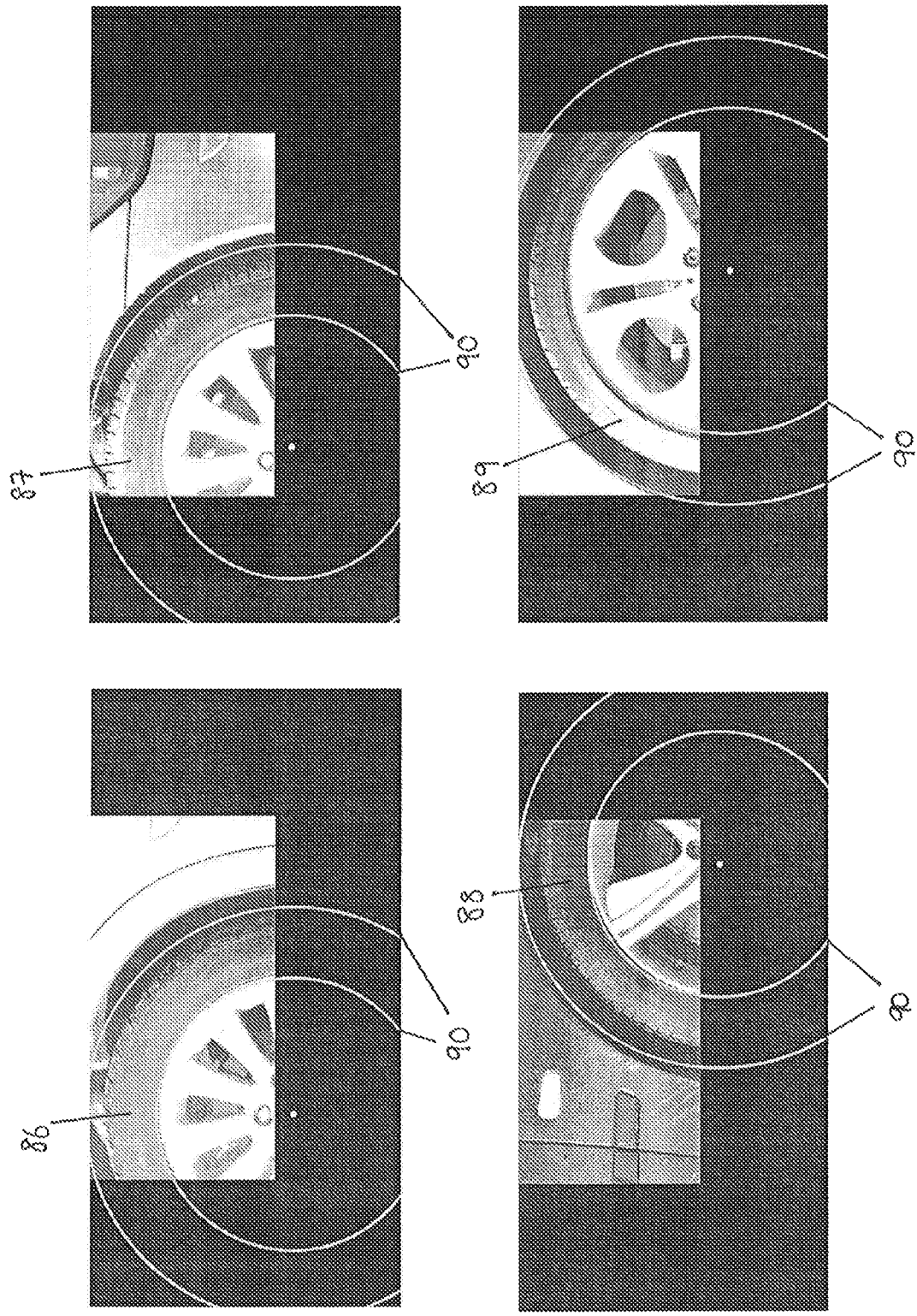
FIG. 18 shows tyre positions extrapolated by image analysis from images of tyre side wall portions.

FIG. 18 shows four example images, each of a different tyre 86, 87, 88, 89, obtained using the system depicted in FIG. 14. Image analysis software has been used to identify the tyre in the image and to extrapolate the position of the whole tyre. The extrapolated position is shown in each image using white circles 90 which indicate the inner edge and periphery of the tyre.

Figure 19:
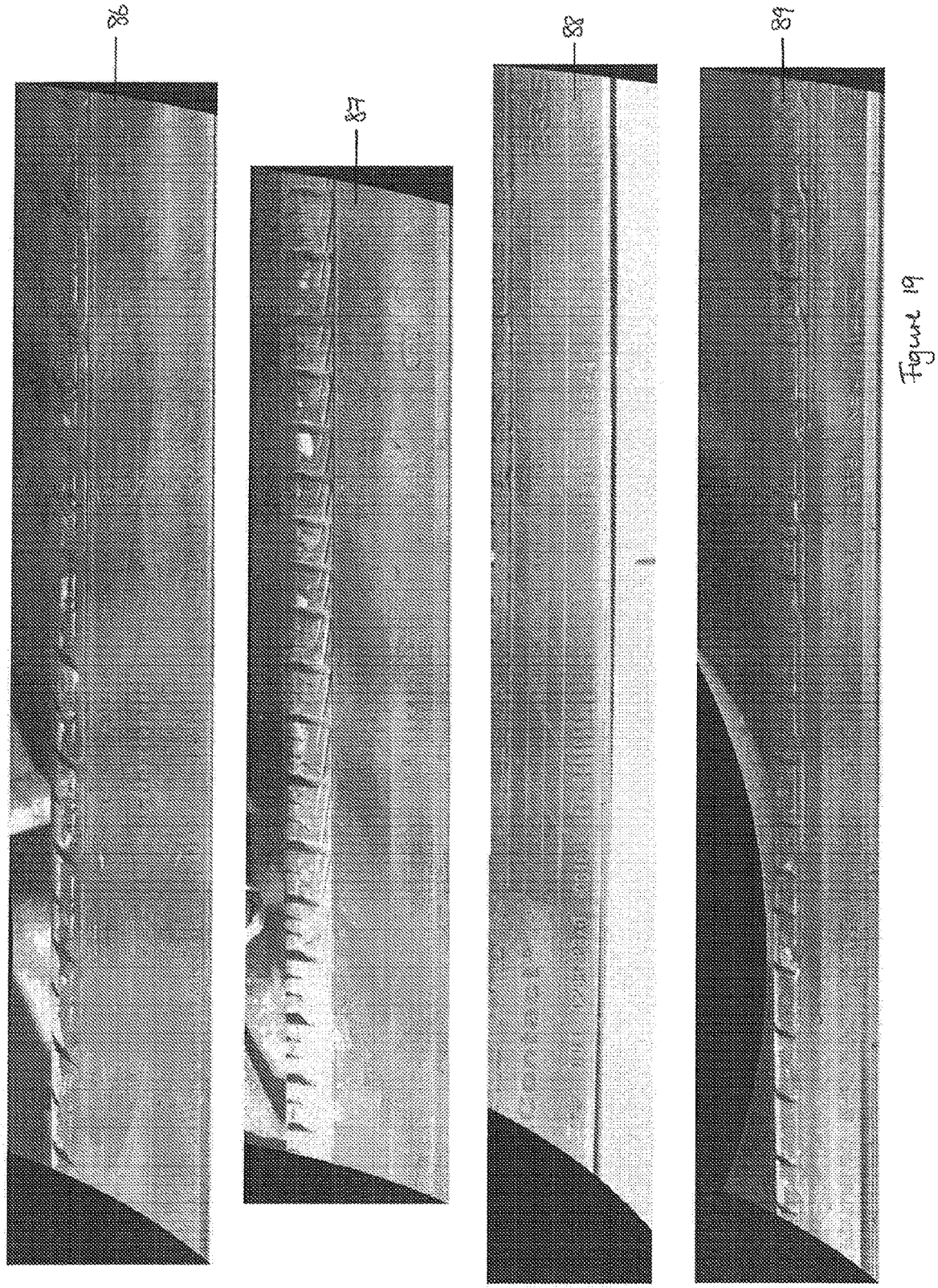
FIG. 19 shows unwrapped images of the tyre side wall portions shown in FIG. 18.

Once the position of the tyre has been identified, the image software can be used to unwrap the tyre to show the entire side wall as a single elongate image. This is shown in FIG. 19. The four images correspond to a respective tyre as shown in FIG. 18. Having an unwrapped image of the side wall can assist with assessment of side wall damage, as the entire side wall is visible in a single image. It can also assist with the extraction of data from embossed markings on the side wall, as in the unwrapped images, the text can be viewed upright in a rectilinear format, which may help with, for example, optical character recognition for reading the data.

FIGS. 20 to 26 show example side wall images obtained using a system in accordance with the present invention.

Figure 20:
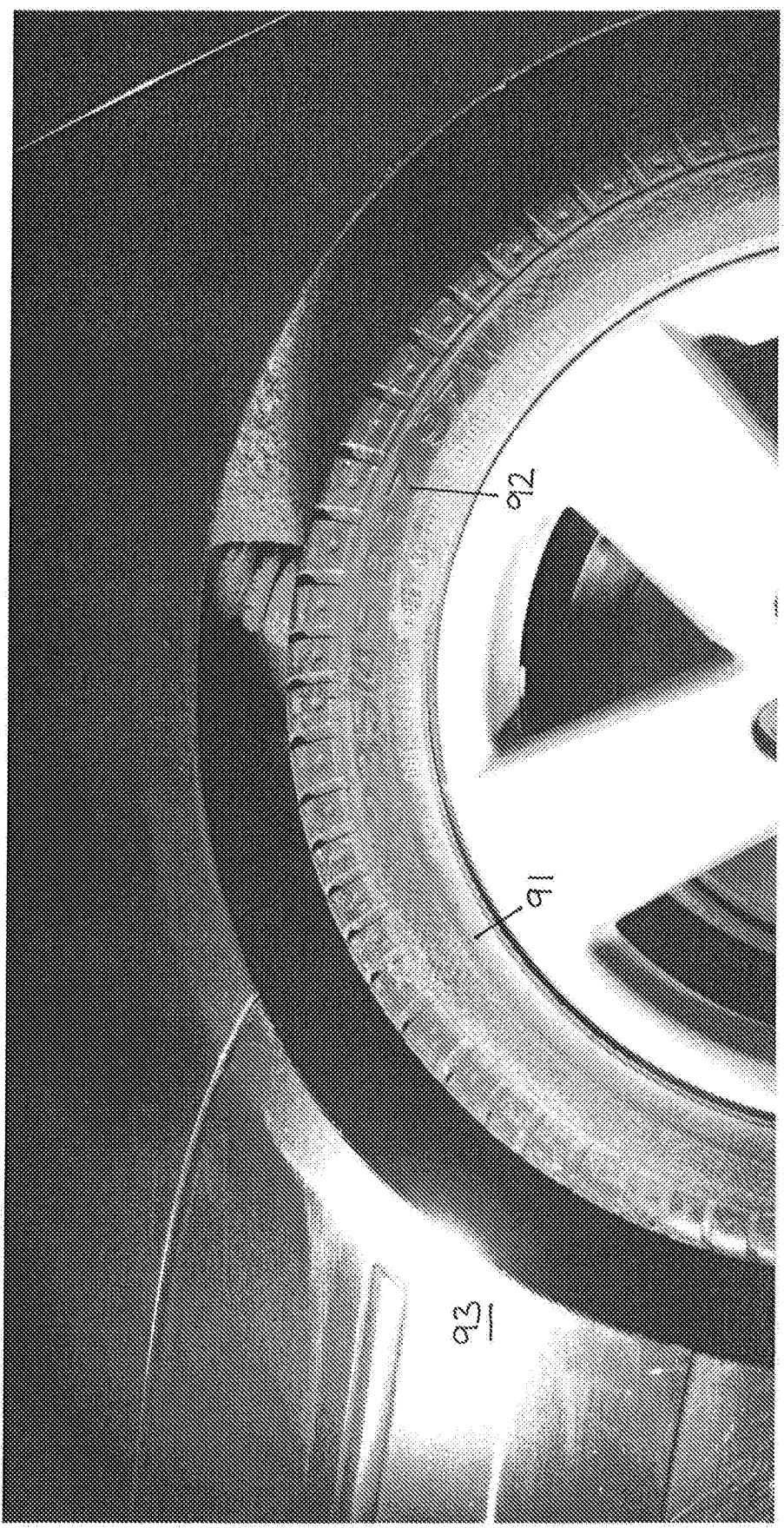
FIG. 20 shows an example of embossed text on the side wall of a tyre which has been imaged using a method in accordance with the invention.

In FIG. 20, the top half of a side wall 91 has been imaged. In the image embossed text 92 can be seen. The text has been illuminated by a flash of light from a flash unit so that the embossed text casts shadows, creating contrasting regions of shadow and light causing the text to be clearly visible in the image. A reflection 93 of the flash of light can be seen in the bodywork of the car.

Figure 21:
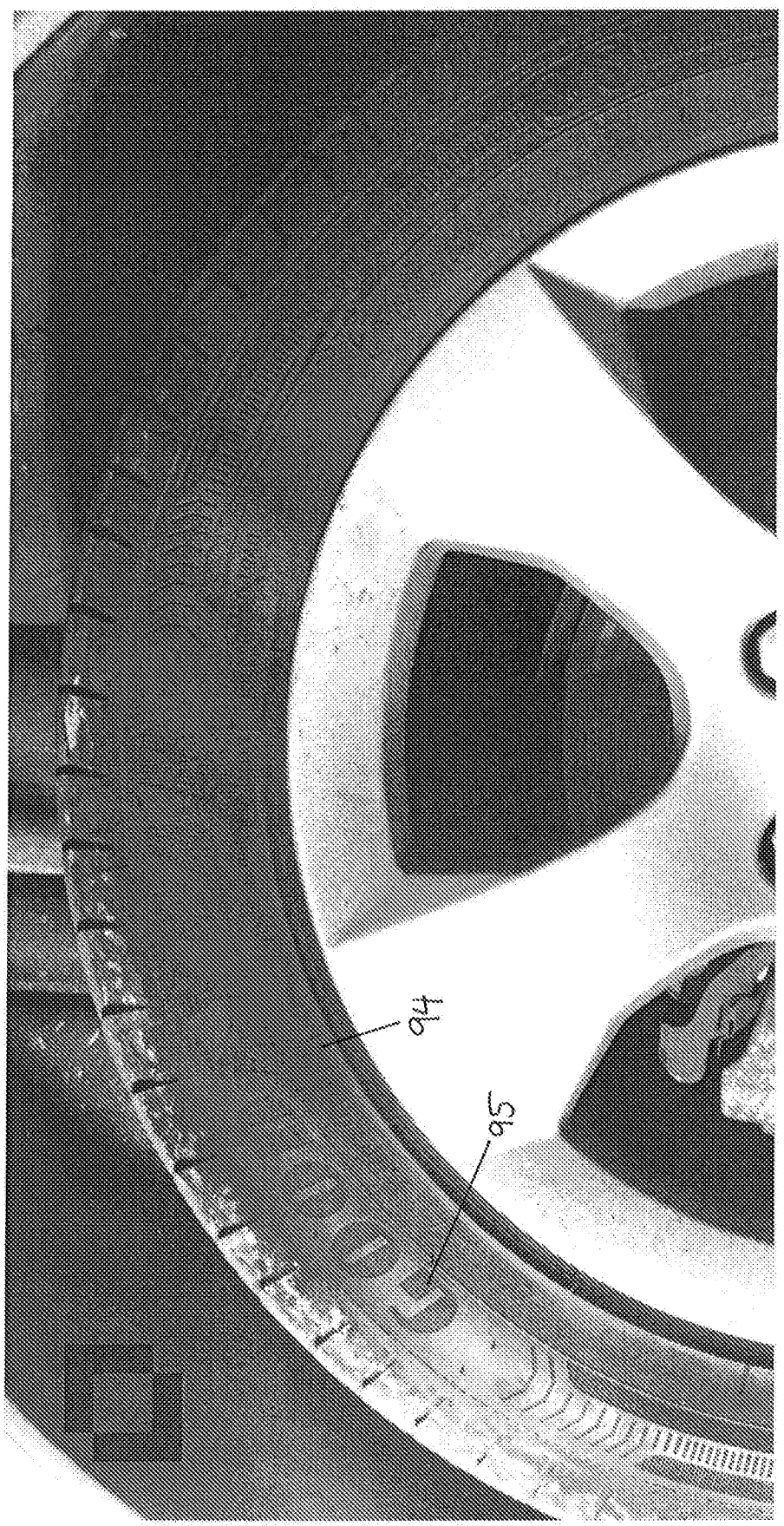
FIG. 21 shows another example of an image of a side wall showing embossed text.

FIG. 21 shows another example of a side wall 94 that has been imaged in accordance with the present invention. Again, embossed text 95 can be seen on the side wall 94.

Figure 22:
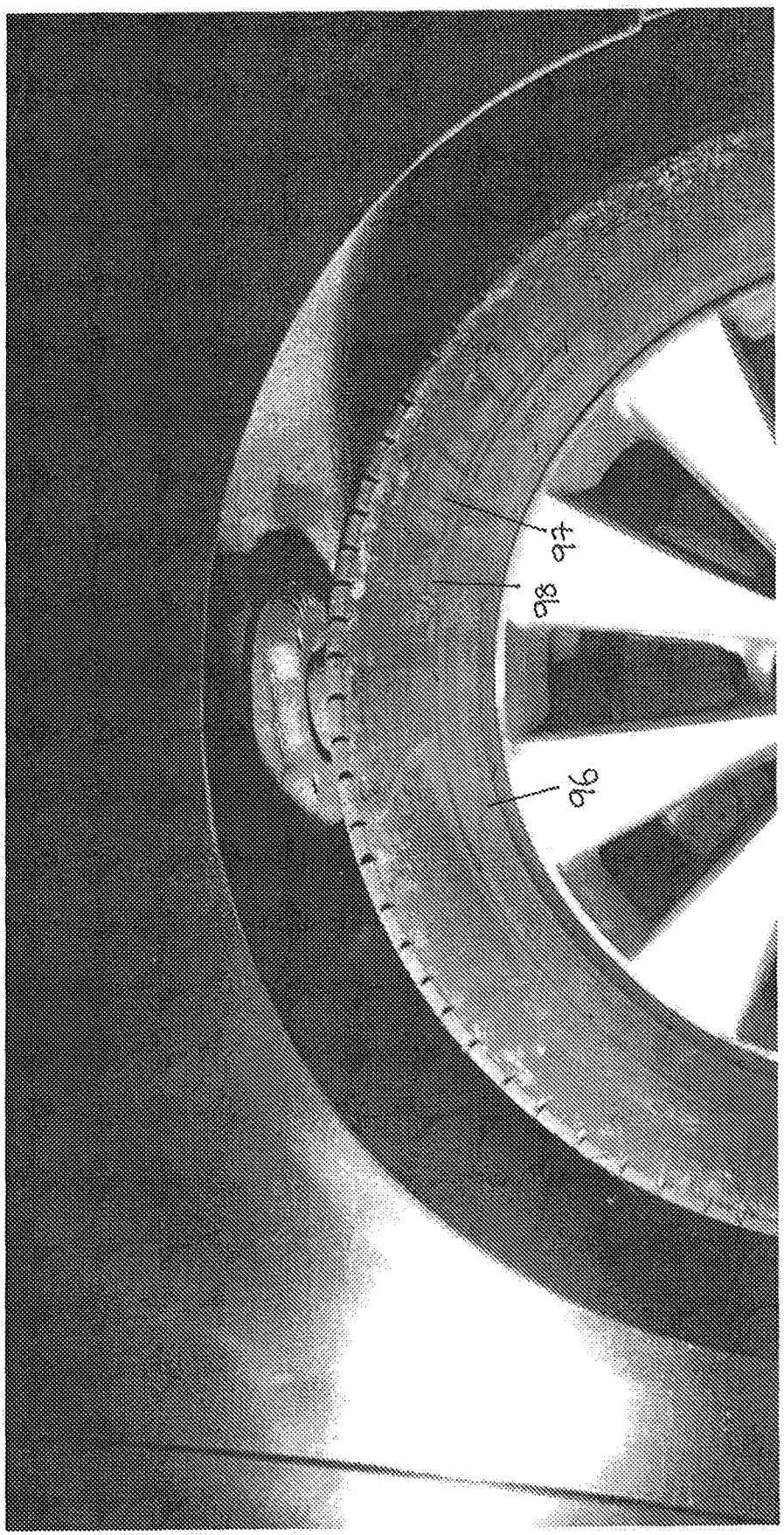
FIG. 22 shows a further example of an image of a side wall with embossed text.

FIG. 22 shows a further example of a side wall 96 that has been imaged, with embossed text 97. On some of the side walls, there are also logos—for example, the logo 98 visible in FIG. 22. Image analysis of logos, pictograms, and similar markings may also be carried out by image analysis software to identify a tyre or otherwise obtain information related to it.

Figure 23:
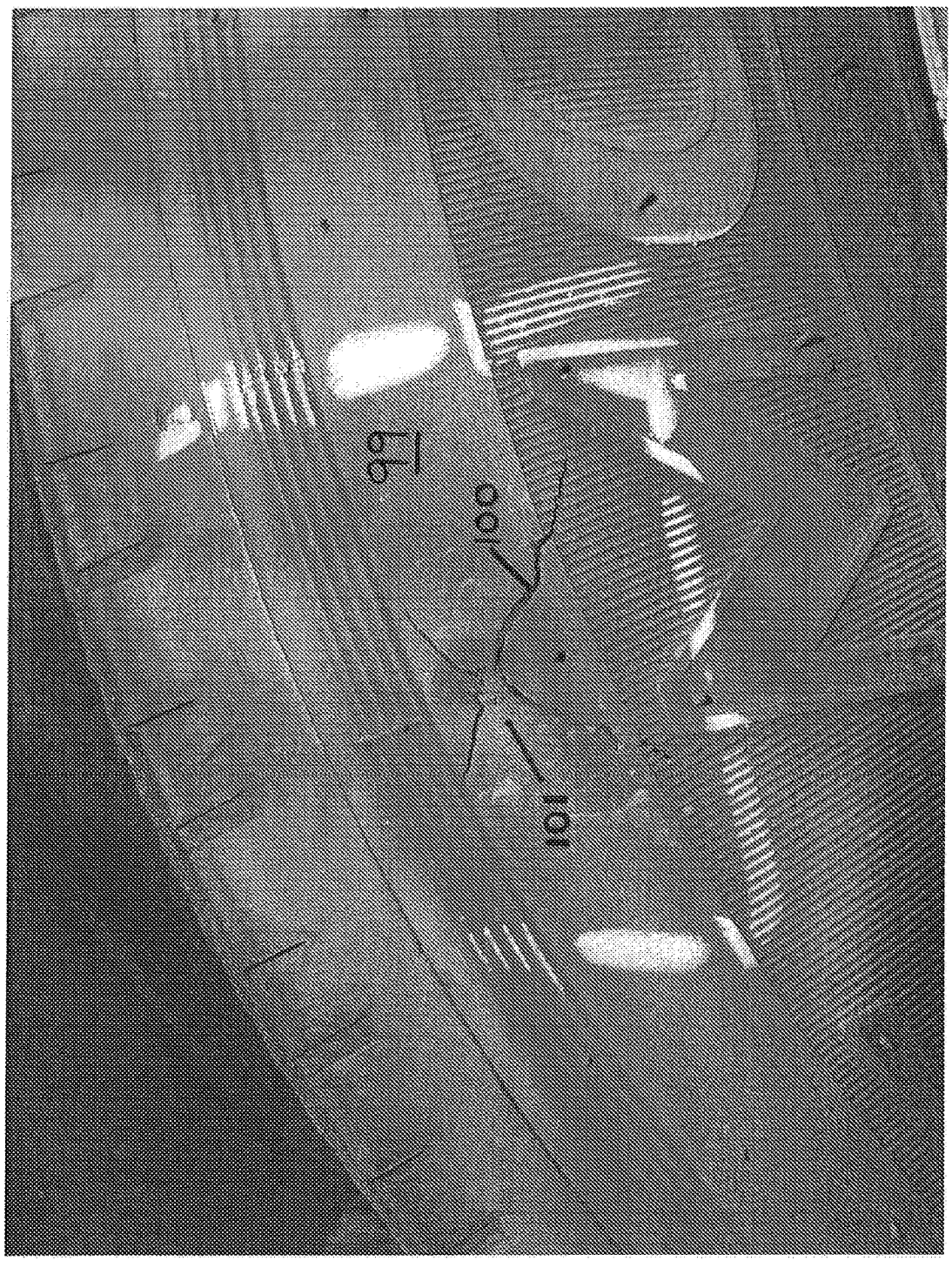
FIG. 23 shows an example image of a side wall with crack damage in the region of a side wall wear indicator.

FIG. 23 shows an example of an image of a side wall 99 of a tyre, where the side wall has been damaged. The damage is visible as cracking 100 in the region of a side wall wear indicator 101. The wear indicator is provided in the tyre to provide an early indication that the thickness of the side wall is being reduced, and that a tyre will soon need to be replaced.

Figure 24:
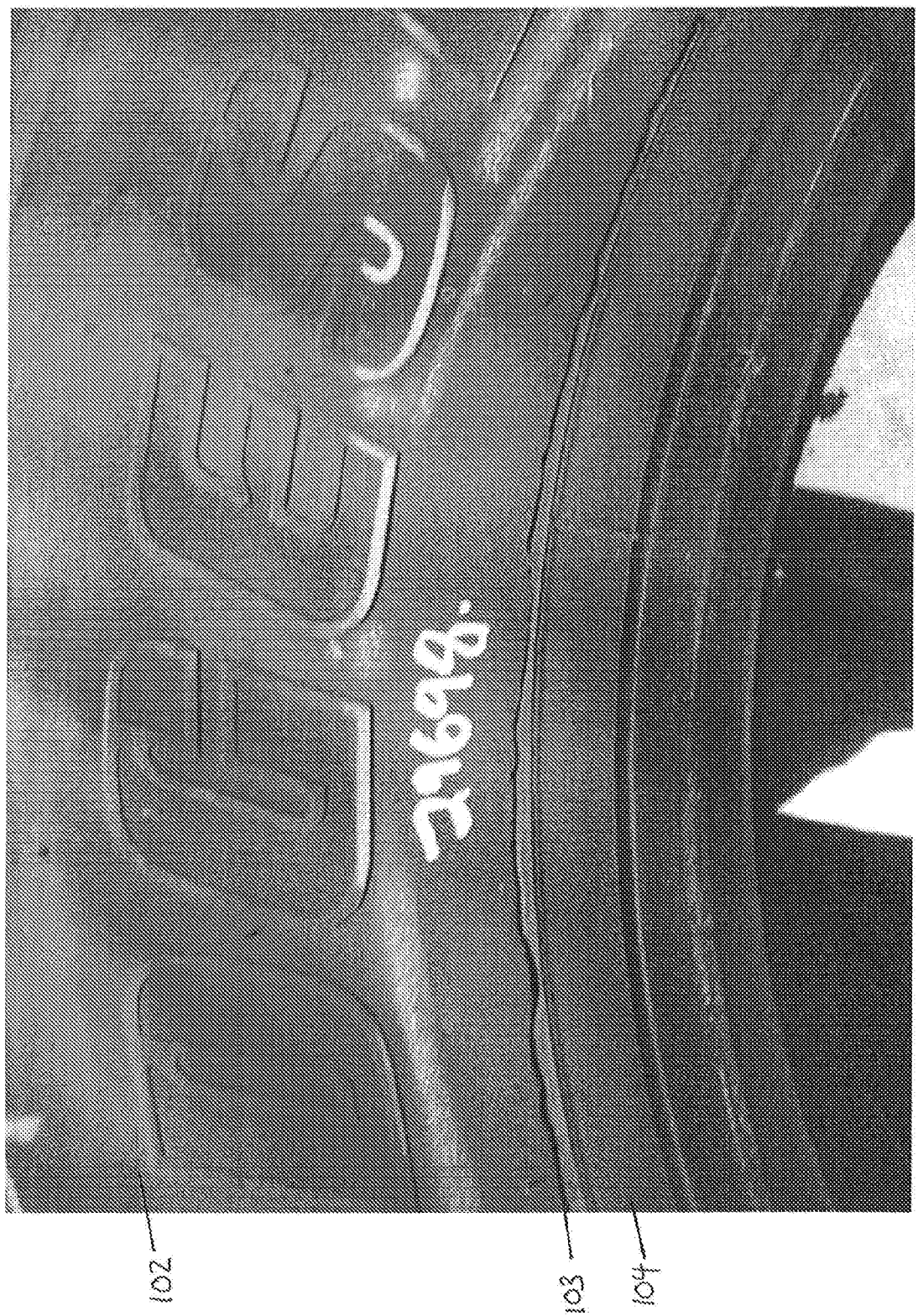
FIG. 24 shows an example image showing crack damage in the region of a tyre bead.

FIG. 24 shows another example of damage in the side wall 102 of a tyre. Cracking 103 is visible in the region of the tyre bead 104.

Figure 25:
FIG. 25 shows an example image of a tyre side wall with damage from retread failure.

FIG. 25 shows an image of a tyre side wall 105 showing damage 106 resulting from retread failure, i.e. where replacement tread has been applied to a worn tyre to repair it, but the new tread has become detached from the tyre body.

Figure 26:
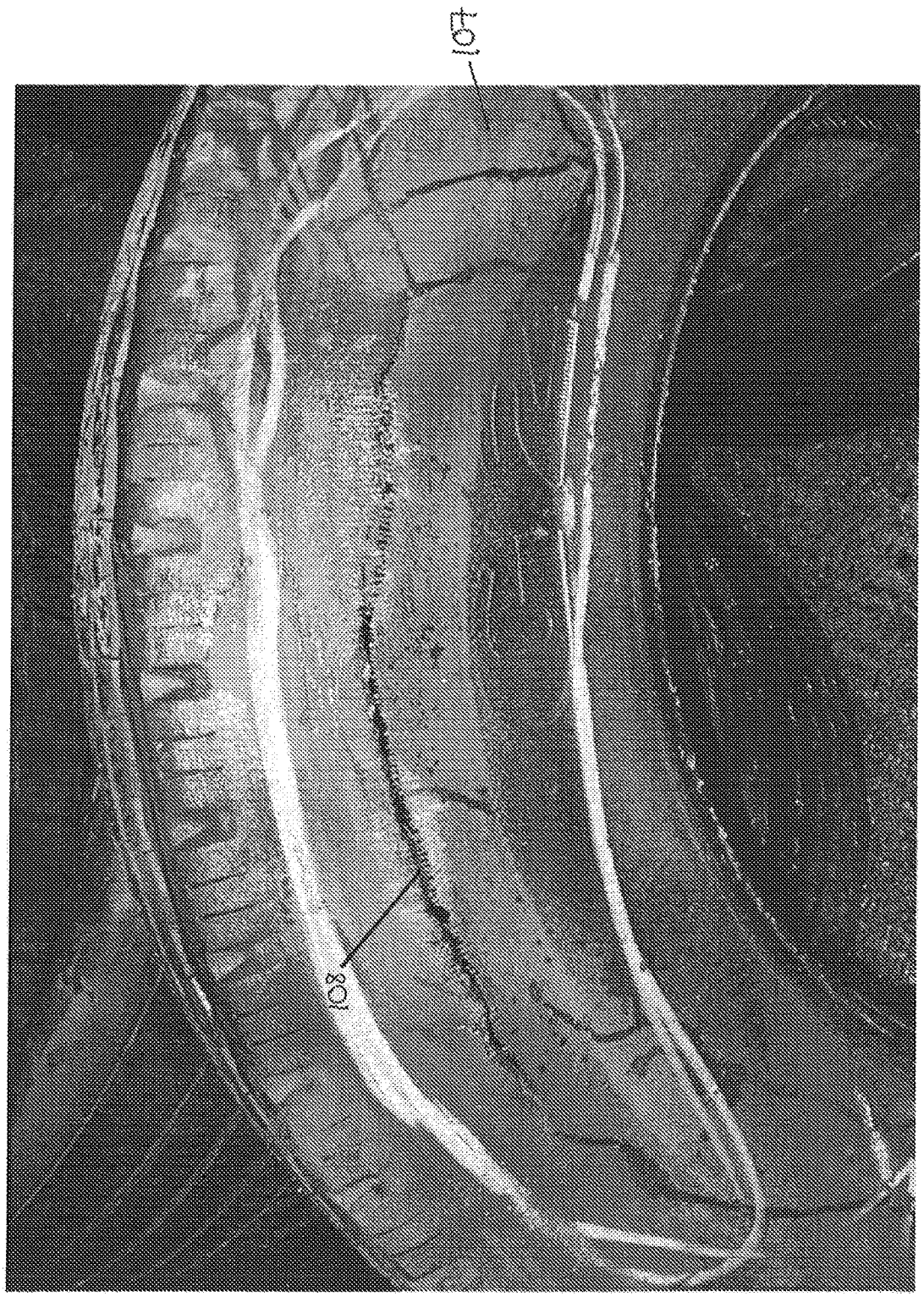
FIG. 26 shows an example image of a tyre side wall showing a zipper rupture.

FIG. 26 shows a further image of a tyre side wall 107 showing a tyre zipper rupture, i.e. a circumferential rupture in the mid side wall of the tyre.

The invention claimed is:

1. A method of assessing the condition of a tyre on a wheel which is mounted on a vehicle, while the vehicle is moving and the tyre is rotating and moving longitudinally along a path of movement, the periphery of the tyre having tread portions separated by tread gaps; in which the method comprises using an imaging device to capture images of a plurality of different portions of the periphery of the tyre whilst the tyre revolves, the images being captured whilst longitudinally spaced flash units are activated to illuminate portions of the periphery of the tyre, the flash units being positioned to one side of the path of movement of the tyre and directing light at an acute angle to the path of movement of the tyre, the light causing shadows to be cast in the tread gaps between tread portions; and the images are analysed by data processing apparatus which determines the extent of shadows in the tread gaps so as to provide an indication of the depth of the tread gaps; wherein each flash unit causes a series of flashes of light to be produced when the flash unit is activated, each flash of light in the series being separated from the next flash of light in the series by an interval;

characterised in that for any flash units which are activated at the same time and illuminate overlapping portions of the periphery of tyre, the respective series of flashes of light are out of phase so that the flashes of light from one flash unit are emitted in the intervals between the flashes of light from the or each other flash unit.

2. A method as claimed in claim 1, wherein each flash unit, when activated, produces a series of substantially identical pulses separated by intervals which are substantially identical.

3. A method as claimed in claim 2, wherein the imaging device captures images at a rate which is substantially double the rate at which pulses are produced when a flash unit is activated.

4. A method as claimed in claim 1, where a control system sends triggers for issuing flashes from the flash units and also triggers for causing the imaging device to capture images.

5. A method as claimed in claim 1, wherein a speed sensing system senses the speed of the vehicle and the rate at which flashes are issued by the flash units and the rate at which images are captured by the imaging device are varied in dependence on the speed of the vehicle.

6. A method as claimed in claim 5, wherein the rate at which flashes are issued by the flash units and the rate at which images are captured by the imaging device, are at a first value if the speed of the vehicle is below a predetermined speed, and at a second, higher, value if the speed of the vehicle is at or above the predetermined speed.

7. A method as claimed in claim 5, wherein the rate at which flashes are issued by the flash units and the rate at which images are captured by the imaging device, are directly related to the speed of the vehicle.

8. A method as claimed in claim 1, wherein the imaging device captures images whilst the tyre completes at least a major part of a complete revolution.

9. A method as claimed in claim 1, further comprising imaging at least part of a side wall of the tyre using a plurality of longitudinally spaced side wall imaging devices to capture images of a plurality of different portions of the side wall of the tyre whilst the tyre revolves, the images being captured whilst longitudinally spaced side flash units are activated to illuminate portions of the side wall of the tyre, the side flash units being positioned to one side of the path of movement of the tyre and directing light onto the side wall of the tyre at an acute angle to the longitudinal path of movement, wherein each side flash unit causes a series of flashes of light to be produced when the side flash unit is activated, each flash of light in the series being separated from the next flash of light in the series by an interval.

10. A method of assessing the condition of a tyre on a wheel which is mounted on a vehicle, while the vehicle is moving and the tyre is rotating and moving longitudinally along a path of movement, the periphery of the tyre having tread portions separated by tread gaps; in which the method comprises using an imaging device to capture images of a plurality of different portions of the periphery of the tyre whilst the tyre revolves, the images being captured whilst a light source is activated to illuminate the portions of the periphery of the tyre; and the images are analysed to determine the depth of the tread gaps; wherein

- a series of a plurality of light sources is positioned to one side of the path of movement of the tyre, each light source serving as a point source of non-collimated light and directing light at an acute angle to the path of movement of the tyre; the light sources being spaced from each other in a longitudinal direction;
- a control system is configured to activate the light sources sequentially whilst the tyre moves along said path of movement, so that only one of said light sources of the series illuminates a portion of the periphery of the tyre when an image is being captured by the imaging device of that portion of the periphery of the tyre;
- when a light source is activated to illuminate a portion of the periphery of the tyre, the light source causes shadows to be cast in the tread gaps between tread portions; the imaging device is operated to capture an image of at least part of the illuminated portion of the periphery of the tyre; and the image is analysed by data processing apparatus which determines the extent of the shadow in a tread gap so as to provide an indication of the depth of the tread gap;
- characterised in that the speed of the vehicle is detected and a frame rate at which the imaging device captures images is adjusted in accordance with the detected speed of the vehicle.

11. A method as claimed in claim 10, wherein the frame rate at which images are captured by the imaging device, is at a first value if the speed of the vehicle is below a predetermined speed, and at a second, higher, value if the speed of the vehicle is at or above the predetermined speed.

12. A method as claimed in claim 10, wherein frame rate at which images are captured by the imaging device, is directly related to the speed of the vehicle.

13. A method as claimed in claim 10, wherein the imaging device captures images whilst the tyre completes at least a major part of a complete revolution.

14. A method as claimed in claim 10, further comprising imaging at least part of a side wall of the tyre using a plurality of longitudinally spaced side wall imaging devices to capture images of a plurality of different portions of the side wall of the tyre whilst the tyre revolves, the images being captured whilst longitudinally spaced side flash units are activated to illuminate portions of the side wall of the tyre, the side flash units being positioned to one side of the path of movement of the tyre and directing light onto the side wall of the tyre at an acute angle to the longitudinal path of movement, wherein each side flash unit causes a series of flashes of light to be produced when the side flash unit is activated, each flash of light in the series being separated from the next flash of light in the series by an interval.

15. A system for assessing the condition of a tyre on a wheel which is mounted on a vehicle, while the vehicle is moving and the tyre is rotating and moving longitudinally along a path of movement, the periphery of the tyre having tread portions separated by tread gaps; the system comprising:

- longitudinally spaced flash units positioned to one side of the path of movement of the tyre and directing light at an acute angle to the path of movement of the tyre, the light causing shadows to be cast in the tread gaps between tread portions;
- an imaging device arranged to capture images of a plurality of different portions of the periphery of the tyre whilst the tyre revolves, the images being captured whilst the longitudinally spaced flash units are activated to illuminate portions of the periphery of the tyre; and
- a data processing apparatus arranged to analyse the images and determine the extent of shadows in the tread gaps so as to provide an indication of the depth of the tread gaps; wherein each flash unit causes a series of flashes of light to be produced when the flash unit is activated, each flash of light in the series being separated from the next flash of light in the series by an interval;
- characterised in that for any flash units which are activated at the same time and illuminate overlapping portions of the periphery of tyre, the respective series of flashes of light are out of phase so that the flashes of light from one flash unit are emitted in the intervals between the flashes of light from the or each other flash unit.

16. A system for assessing the condition of a tyre on a wheel which is mounted on a vehicle, while the vehicle is moving and the tyre is rotating and moving longitudinally along a path of movement, the periphery of the tyre having tread portions separated by tread gaps; the system comprising:

- a series of a plurality of light sources positioned to one side of the path of movement of the tyre, each light source serving as a point source of non-collimated light and directing light at an acute angle to the path of movement of the tyre; the light sources being spaced from each other in a longitudinal direction and activated to illuminate a portion of the periphery of the tyre whilst the tyre revolves, wherein the light source causes shadows to be cast in the tread gaps between tread portions;
- an imaging device arranged to capture an image of at least part of the illuminated portion of the periphery of the tyre whilst the tyre revolves;
- a data processing apparatus arranged to analyse the image and determine the extent of the shadow in a tread gap so as to provide an indication of the depth of the tread gap; and
- a control system configured to activate the light sources sequentially whilst the tyre moves along said path of movement, so that only one of said light sources of the series illuminates a portion of the periphery of the tyre when an image is being captured by the imaging device of that portion of the periphery of the tyre; characterised in that the speed of the vehicle is detected and a frame rate at which the imaging device captures images is adjusted in accordance with the detected speed of the vehicle.

* * * * *